US010317559B1

(12) United States Patent
Olsson et al.

(10) Patent No.: US 10,317,559 B1
(45) Date of Patent: *Jun. 11, 2019

(54) GROUND TRACKING DEVICES AND METHODS FOR USE WITH A UTILITY LOCATOR

(71) Applicant: SeeScan Inc., San Diego, CA (US)

(72) Inventors: Mark S. Olsson, La Jolla, CA (US); David A. Cox, San Diego, CA (US); Ryan B. Levin, San Diego, CA (US); Ray Merewether, La Jolla, CA (US); Sequoyah Aldridge, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,654

(22) Filed: Jun. 26, 2017

Related U.S. Application Data

(63) Continuation of application No. 14/797,840, filed on Jul. 13, 2015, now Pat. No. 9,696,448, which is a continuation of application No. 13/161,183, filed on Jun. 15, 2011, now Pat. No. 9,081,109.

(60) Provisional application No. 61/377,215, filed on Aug. 26, 2010, provisional application No. 61/355,035, filed on Jun. 15, 2010.

(51) Int. Cl.
  *G01V 3/15* (2006.01)
  *G01D 5/14* (2006.01)

(52) U.S. Cl.
  CPC .............. *G01V 3/15* (2013.01); *G01D 5/145* (2013.01)

(58) Field of Classification Search
  CPC .................................. G01V 3/15; G01D 5/145
  USPC ....... 324/300, 326–329, 336, 337, 364, 314, 324/600, 637, 639, 614, 667
  See application file for complete search history.

(56) References Cited

U.S. PATENT DOCUMENTS

| | | |
|---|---|---|
| 3,696,510 A | 10/1972 | Evans, Jr. |
| 5,174,038 A | 12/1992 | Neyens et al. |
| 5,517,419 A | 5/1996 | Lanckton et al. |
| 6,252,538 B1 | 6/2001 | Chignell |
| 6,333,631 B1 * | 12/2001 | Das ..................... F41H 11/12 250/392 |
| 6,700,526 B2 | 3/2004 | Witten |
| 6,725,553 B2 | 4/2004 | Airey et al. |
| 6,917,893 B2 | 7/2005 | Dietsch et al. |
| 7,111,412 B2 | 9/2006 | Huang |
| 7,372,247 B1 | 5/2008 | Giusti et al. |

(Continued)

OTHER PUBLICATIONS

Adept Mobilerobots, "MobileRobots," website, Amherst, NH.

(Continued)

*Primary Examiner* — Melissa J Koval
(74) *Attorney, Agent, or Firm* — Steven C. Tietsworth, Esq.

(57) ABSTRACT

A ground tracking apparatus for connection to a locator or other measurement device and configured to determine position, motion, and/or orientation information is disclosed. The ground tracking apparatus may include a ground follower assembly including one or more wheels, which may be detachably coupled to a buried object locator system to capture three-dimensional positional and orientation information during a locate process, as well as provide output data or information to be integrated with maps, photographs, drawings, or other data or information.

12 Claims, 29 Drawing Sheets

(56) References Cited

U.S. PATENT DOCUMENTS

2002/0105469 A1   8/2002   Albats, Jr. et al.
2009/0140887 A1   6/2009   Breed
2011/0001633 A1   1/2011   Lam et al.

OTHER PUBLICATIONS

Strelow, Dennis W., "Motion Estimation from Image and Inertial Measurements," Doctoral Thesis, Nov. 2004, Carnegie Mellon University, Pittsburgh, PA.

* cited by examiner

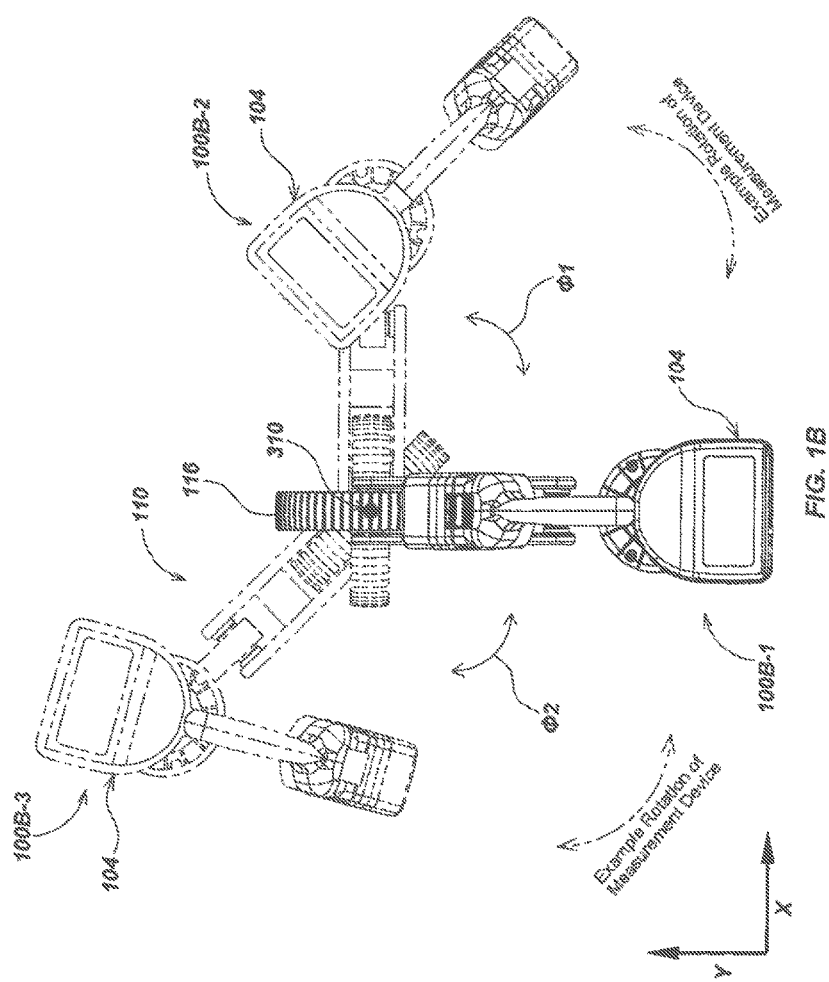

GROUND TRACKING DEVICES AND METHODS FOR USE WITH A UTILITY LOCATOR

CROSS-REFERENCE TO RELATED APPLICATIONS

This application is a continuation of and claims priority to co-pending U.S. patent application Ser. No. 14/797,840, entitled GROUND-TRACKING DEVICES AND METHODS FOR USE WITH A UTILITY LOCATOR, filed on Jul. 13, 2015, which is a continuation of and claims priority to U.S. patent application Ser. No. 13/161,183, now U.S. Pat. No. 9,081,109, entitled GROUND-TRACKING DEVICES FOR USE WITH A MAPPING LOCATOR, filed on Jun. 15, 2011, which claims priority under 35 U.S.C. § 119(e) to U.S. Provisional Patent Application Ser. No. 61/377,215, entitled GROUND TRACKING DEVICE FOR A MAPPING LOCATOR, filed on Aug. 26, 2010, and to U.S. Provisional Patent Application Ser. No. 61/355,035, entitled MECHANICAL GROUND TRACKING DEVICE FOR A MAPPING LOCATOR, filed on Jun. 15, 2010. The content of each of these applications is hereby incorporated by reference herein in its entirety for all purposes.

This application is also related to U.S. Provisional Patent Application Ser. No. 60/730,124, entitled SELF-STANDING MAPPING SONDE AND LINE LOCATOR EMPLOYING IMPROVED DISPLAY METHODS WITH INTEGRAL GROUND-PENETRATING RADAR AND OTHER DETACHABLE DETECTION APPARATUS, filed on Oct. 24, 2005, and to U.S. Provisional Patent Application Ser. No. 61/262,852, entitled IMAGE-BASED MAPPING LOCATOR SYSTEM, filed Nov. 19, 2009. The content of each of these applications is hereby incorporated by reference herein in its entirety for all purposes.

FIELD

The present disclosure relates generally to systems, methods, and apparatus for locating buried objects ("locators"). More specifically, but not exclusively, the system relates to ground tracking devices for attachment to locators or other measurement devices to follow a ground or other surface and provide position and/or motion information in multiple axes of motion.

BACKGROUND

There are many situations where is it desirable to locate buried utilities or other objects, such as pipes and cables. For example, prior to starting any new construction that involves excavation, it is important to locate buried objects, such as underground utilities like power lines, gas lines, phone lines, fiber optic cable conduits, CATV cables, sprinkler control wiring, water pipes, sewer pipes, and the like (collectively and individually referred to herein as "utilities" or "objects"). As used herein the term "buried" refers not only to objects below the surface of the ground, but also to objects located inside walls, between floors in multi-story buildings, cast into concrete slabs, or otherwise obscured, covered, or hidden from direct view or access.

Location of these buried objects may be important for cost, time, and safety reasons. For example, if a backhoe or other excavation equipment hits a high voltage line or a gas line, serious injury and property damage may result. Severing water mains and sewer lines leads to messy cleanups. The destruction of power and data cables can seriously disrupt the comfort and convenience of residents and create huge financial losses.

Buried objects can be located by sensing an emitted electromagnetic signal. For example, some buried cables, such as electric power lines, are already energized and emit their own long cylindrical electromagnetic field. In other cases, the buried object may be energized to produce electromagnetic radiation. For example, an external electrical power source having, for example, a frequency in a range of approximately 50 Hz to 500 kHz may be used to energize a buried object such as a pipe or conduit. Location of buried long conductors is often referred to as "line tracing," and the results may be referred to as a "locate."

SUMMARY

The present disclosure relates generally to systems, methods, and apparatus for locating buried objects ("locators"). More specifically, but not exclusively, the disclosure relates to ground tracking devices for attachment to locators or other measurement devices to follow a ground or other surface and provide position and/or motion information in multiple axes of motion.

For example, in one aspect, the disclosure relates to a ground tracking device. The ground tracking device may include a ground follower assembly, and a mounting assembly configured to floatably attach the ground follower assembly to a measurement device. The ground follower assembly may be configured to generate one or more output signals representative of a motion of the measurement device over a ground surface in two or more axes or dimensions of motion.

In another aspect, the disclosure relates to a ground tracking device. The ground tracking device may include, for example, a wheel, a wheel sensor element configured to measure a rotation of the wheel and generate a wheel rotation output signal corresponding to the rotation of the wheel, a swing arm assembly coupled at a first end to the wheel assembly, a yoke assembly coupled at a second end of the swing arm assembly, a swing arm sensor element configured to sense a rotary motion of the second end of the swing arm assembly and generate a swing arm rotation output signal corresponding to the rotary motion of the swing arm assembly, and a yoke sensor element configured to sense a rotation of the yoke assembly relative to a centerline of a measurement device and generate a yoke rotation signal corresponding to the rotation of the yoke assembly.

In another aspect, the disclosure relates to a dual wheel ground tracking device. The ground tracking device may include, for example, a wheel arm structure assembly, a first wheel coupled to the wheel arm structure assembly, a first wheel sensor element configured to measure a rotation of the first wheel and generate a first wheel rotation output signal corresponding to the rotation of the first wheel, a second wheel coupled to the wheel arm structure assembly and the first wheel, a second wheel sensor element configured to measure a rotation of the second wheel and generate a second wheel rotation output signal corresponding to the rotation of the second wheel, a yoke assembly, a wrist joint assembly coupled between the wheel arm structure assembly and the yoke assembly, a yoke sensor element configured to sense a rotation of the yoke assembly relative to a centerline of a measurement device and generate a yoke rotation signal corresponding to the rotation of the yoke assembly, and a wrist joint sensor element configured to sense a movement of the wheel arm structure assembly relative to the yoke assembly and generate a wheel arm movement signal corresponding to the movement of the wheel arm structure assembly relative to the yoke assembly.

In another aspect, the disclosure relates to a ground tracking locator system. The ground tracking locator system may include a portable locator, and a ground tracking device. The ground tracking device may include a ground follower assembly, and a mounting assembly configured to floatably attach the ground follower assembly to the portable locator. The ground follower assembly may be configured to generate one or more output signals representative of a motion of the locator device over a ground surface in two or more axes or dimensions of motion.

Various additional aspects, features, functions, and details are further described below in conjunction with the appended Drawings.

BRIEF DESCRIPTION OF THE DRAWINGS

FIG. 1B illustrates details of example movements of a locator and attached ground tracking device about a substantially fixed ground reference point in accordance with aspects of the present disclosure.

DETAILED DESCRIPTION OF EMBODIMENTS

Figure 1A:
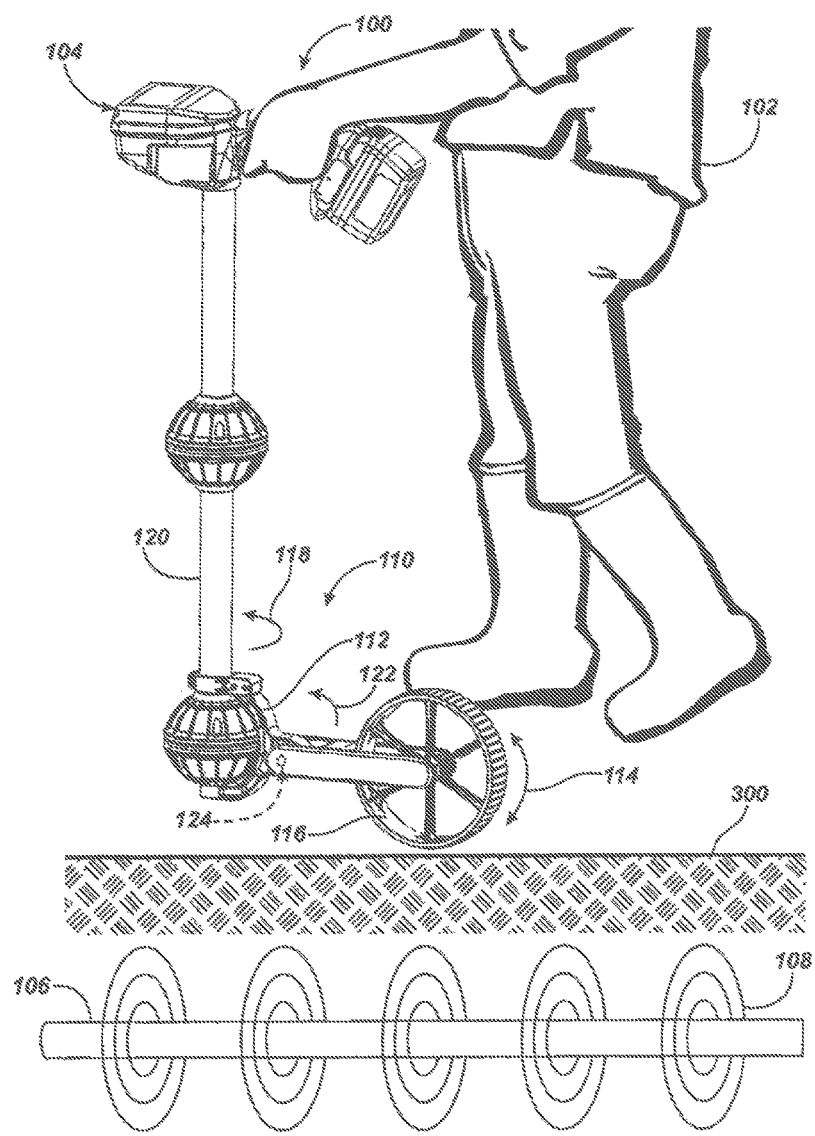
FIG. 1A illustrates use of an embodiment of a ground tracking system including a ground tracking device and a locator in accordance with aspects of the present disclosure.

The present disclosure relates generally to systems, methods, and apparatus for locating buried objects. Objects for locating buried objects are denoted herein as "locators." More specifically, but not exclusively, the disclosure relates to ground tracking devices for attachment to locators or other measurement devices to follow a ground or other surface and provide position and/or motion information in multiple axes of motion.

For example, in one aspect, the disclosure relates to a ground tracking device. The ground tracking device may include a ground follower assembly, and a mounting assembly configured to floatably attach the ground follower assembly to a measurement device. The ground follower assembly may be configured to generate one or more output signals representative of a motion of the measurement device over a ground surface in two or more axes or dimensions of motion.

The mounting apparatus may, for example, be configured to detachedly mount the ground follower assembly to the measurement device. The measurement device may be a portable locator device or other test or measurement instrument or device. The ground follower assembly may include a yoke element and a swing-arm element, and the mounting assembly may include a bracket assembly configured to detachably connect the yoke element to the measurement device.

The ground follower assembly may include, for example, a ground follower element, a swing-arm element coupled to the ground follower element, a yoke element coupled between the swing-arm element and the mounting assembly, and a plurality of sensors configured to sense movement of the ground follower assembly relative to a ground surface or other surface in two or more axes of motion and generate the one or more output signals based at least in part on the sensed movement. The plurality of sensors may include, for example, magnetic sensors, and the ground follower assembly may further include a corresponding plurality of magnets. The magnetic sensors may be three-axis magnetic sensors.

The ground follower element may include, for example, a wheel, and the yoke may be a C-shaped yoke. Alternately, the ground follower element may include two or more wheels. Alternately, the ground follower element may include a sphere or other ground tracking element or device.

The ground tracking device may further include, for example, a surface sensing apparatus. The surface sensor apparatus may be configured to provide a signal usable to determine a ground surface characteristic. The surface sensing apparatus may include a ground surface sensor configured to sense light reflected from the ground or other surface and provide a ground surface output signal associated with a surface characteristic. The surface sensing apparatus may further include a lighting element configured to generate a light output directed at the ground surface, and the ground surface sensor is configured to generate the ground surface output based at least in part on reflection of the light output from the ground surface. The ground surface sensor may be an optical sensor. The ground surface sensor may be a single sensor. The optical sensor may be a linear row of pixel sensors or a grid of pixel sensors. The ground surface sensor may be a camera element, such as a digital camera sensor element. The lighting element may be a light emitting diode (LED) or other lighting element. The light emitting element may include a white LED. The light emitting element may include LEDs or other lighting elements of specific wavelengths or ranges of wavelengths. The wavelengths may be selected based on a ground or surface characteristic, such as light absorption or reflectivity. The light emitting element may include an array of LEDs or other light emitting devices. The ground tracking device may further include a circuit configured to determine, based at least in part on the output signal from the ground surface sensor, a ground type.

The motion of the measurement device to be sensed may include, for example, a rotational motion about a substantially fixed ground reference point, and the one or more output signals may include one or more signals corresponding to the rotational motion about the substantially fixed ground point. Alternately, or in addition, the motion of the measuring device to be sensed may include an up or down motion of the ground tracking device about the ground surface, and the one or more signals may include one or more signals corresponding to the up or down motion. Alternately, or in addition, the motion of the measuring device may include a side-to-side motion and the one or more signals include one or more signals corresponding to the side-to-side motion. Alternately, or in addition, the motion of the measurement device to be sensed may include a translational motion over the ground surface, and the one or more signals may include one or more signals corresponding to the translational motion.

The ground tracking device may further include, for example, a compass device. The compass device may be configured to generate a compass output signal corresponding to a position of the ground follower assembly. The ground tracking device may further include an accelerometer. The accelerometer may be configured to generate an accelerometer output signal corresponding to a motion of the ground follower assembly. The ground tracking device may further include a sensor apparatus configured to sense a rotation of one or more wheels associated with translation motion of the measurement device. The ground tracking device may further include a GPS receiver module or other terrestrial or satellite position location device.

The motion of the measurement device to be sensed may include, for example, a rotational motion about a substantially fixed ground reference point, and the one or more output signals may include one or more signals corresponding to the rotational motion about the substantially fixed ground point; an up or down motion of the ground tracking device about the ground surface, and the one or more signals include one or more signals corresponding to the up or down motion; and a side-to-side motion and the one or more signals include one or more signals corresponding to the side-to-side motion. The motion of the measurement device to be sensed may further includes a translational motion over the ground surface, and the one or more signals further include one or more signals corresponding to the translational motion.

The ground tracking device may further include, for example, one or more Sondes coupled to a ground follower element such as one or more wheels. The ground tracking device may include ones of a plurality of Sondes coupled to ones of a plurality of wheels.

In another aspect, the disclosure relates to a ground tracking device. The ground tracking device may include, for example, a wheel, a wheel sensor element configured to measure a rotation of the wheel and generate a wheel rotation output signal corresponding to the rotation of the wheel, a swing arm assembly coupled at a first end to the wheel assembly, a yoke assembly coupled at a second end of the swing arm assembly, a swing arm sensor element configured to sense a rotary motion of the second end of the swing arm assembly and generate a swing arm rotation output signal corresponding to the rotary motion of the swing arm assembly, and a yoke sensor element configured to sense a rotation of the yoke assembly relative to a centerline of a measurement device and generate a yoke rotation signal corresponding to the rotation of the yoke assembly.

In another aspect, the disclosure relates to a dual wheel ground tracking device. The ground tracking device may include, for example, a wheel arm structure assembly, a first wheel coupled to the wheel arm structure assembly, a first wheel sensor element configured to measure a rotation of the first wheel and generate a first wheel rotation output signal corresponding to the rotation of the first wheel, a second wheel coupled to the wheel arm structure assembly and the first wheel, a second wheel sensor element configured to measure a rotation of the second wheel and generate a second wheel rotation output signal corresponding to the rotation of the second wheel, a yoke assembly, a wrist joint assembly coupled between the wheel arm structure assembly and the yoke assembly, a yoke sensor element configured to sense a rotation of the yoke assembly relative to a centerline of a measurement device and generate a yoke rotation signal corresponding to the rotation of the yoke assembly, and a wrist joint sensor element configured to sense a movement of the wheel arm structure assembly relative to the yoke assembly and generate a wheel arm movement signal corresponding to the movement of the wheel arm structure assembly relative to the yoke assembly.

In another aspect, the disclosure relates to a ground tracking locator system. The ground tracker locator system may include a portable locator and a ground tracking device. The ground tracking device may include a ground follower assembly, and a mounting assembly configured to floatably attach the ground follower assembly to the portable locator. The ground follower assembly may be configured to generate one or more output signals representative of a motion of the locator device over a ground surface in two or more axes or dimensions of motion.

Various embodiments of the present disclosure may be used or combined with buried object locators and associated devices, such as sondes. For example, various ground tracking device embodiments may be combined with locators and sondes such as are described in U.S. Pat. No. 7,009,399, entitled OMNIDIRECTIONAL SONDE AND LINE LOCATOR, issued Mar. 7, 2006; in U.S. Pat. No. 7,332,901, entitled LOCATOR WITH APPARENT DEPTH INDICATION, issued Feb. 19, 2008; U.S. Pat. No. 7,336,078, entitled MULTI-SENSOR MAPPING OMNIDIRECTIONAL SONDE AND LINE LOCATORS, issued Feb. 26, 2008; U.S. Pat. No. 7,443,154, entitled MULTI-SENSOR MAPPING OMNIDIRECTIONAL SONDE AND LINE LOCATOR, issued Oct. 28, 2008; U.S. Pat. No. 7,619,516, entitled SINGLE AND MULTI-TRACE OMNIDIRECTIONAL SONDE AND LINE LOCATORS AND TRANSMITTER USED THEREWITH, issued Nov. 17, 2009; U.S. Pat. No. 7,733,077, entitled MULTI-SENSOR MAPPING OMNIDIRECTIONAL SONDE AND LINE LOCATORS AND TRANSMITTER USED THEREWITH, issued Jun. 8, 2010; U.S. Pat. No. 7,741,848, entitled ADAPTIVE MULTICHANNEL LOCATOR SYSTEM FOR MULTIPLE PROXIMITY DETECTION, issued Jun. 22, 2010; U.S. Pat. No. 7,755,360, entitled PORTABLE LOCATOR SYSTEM WITH JAMMING REDUCTION, issued Jul. 13, 2010; U.S. Pat. No. 7,825,647, entitled METHOD FOR LOCATING BURIED PIPES AND CABLES, issued Nov. 2, 2010; U.S. Pat. No. 7,830,149, entitled AN UNDERGROUND UTILITY LOCATOR WITH A TRANSMITTER, A PAIR OF UPWARDLY OPENING POCKETS AND HELICAL COIL TYPE ELECTRICAL CORDS, issued Nov. 9, 2010; as well as in U.S. Patent Publication 2011/0006772, entitled TRIPOD BURIED LOCATOR SYSTEM, published Jan. 13, 2011 (collectively referred to herein as the "related applications"). The content of each of these applications is incorporated by reference herein in its entirety.

The term "exemplary" is used herein to mean "serving as an example, instance, or illustration." Any aspect and/or embodiment described herein as "exemplary" is not necessarily to be construed as preferred or advantageous over other aspects and/or embodiments.

Overview

The ability to perform reliable mapping while locating buried objects can provide various advantages. For example, mapping can be combined with locating results to record, store, and re-use the results of previous locating tasks, known as "locates," as well as reducing unnecessary repetitive visits to the same site. Operators can improve the accuracy of locates, as well as improve the ability to revisit and re-mark utilities more rapidly for later excavation, by accurately relating them to surface positions and features. Other potential advantages of reliable mapping may include speed improvement, accuracy improvement, cost reductions, and/or other advantages.

Various embodiments of the present disclosure may be used to facilitate integration of mapping and imagery data with information collected by a buried object locator. This may be done by, for example, measuring movement information to reduce the variability of positional data and information of a hand-held locator relative to a ground surface or other surface or position of the locator (relative to a reference point or surface), such as described subsequently herein.

In traditional locating, a hand-held locating device is held at an indeterminate and variable distance above the ground's surface as an operator/user walks along the path of a detected signal (typically associated with the buried object, such as a pipe or cable). For example, a user may trace a buried power cable by measuring electromagnetic signals generated by the conductor, or may locate or trace signals generated by sondes. In operation, the locator is often swung from side to side to attempt to determine the maximum signal from the buried utility. This introduces user-induced variability in measurement and position determination. This user-induced variability may become compounded in situations where a traced signal becomes distorted or ambiguous due to signal dissipation, bleed-through from other conductors, and/or due to other factors, such as electromagnetic distortions, interference from other signals, buried utility path changes or branches, etc.

In order to facilitate better locates, accurate recording of the position of a locating device from moment to moment in multiple axes, such as two or three axes (X, Y and/or Z) relative to ground or surface positions, as well as rotational orientation around axes X, Y and Z, side-to-side movements, and/or other movements may be used. Although simple wheel-based counters have been used to measure distance traveled, this measurement approach is limited to providing an approximately linear measurement from a known starting point or position. Traditional wheel-based counters cannot, however, provide measurement laterally or vertically (Y and Z), and they ignore rotational orientation around the three axes (e.g., axes in X, Y, and Z dimensions).

In addition, the accuracy of computed depth readings of buried conductors by modern locating devices may be improved by determining an accurate value for the height above ground of the antenna used in detecting the conductor. In the absence of measurement of the relative height above ground of the locator, such computation must depend on estimates and approximation.

Various embodiments of the present disclosure may be used to provide an improved ground-tracking device capable of capturing positional and/or orientation information of an associated utility locator in multiple dimensions and axes of motion. The illustrated embodiments are generally configured for use with an appropriately constructed locator, such as those illustrated in the related applications, in which the lower antenna enclosure is optionally fitted with an accessory port. However, other configurations of locators or other attached devices may also be used within the spirit and scope of the present invention.

The illustrated embodiments may be integrated with sensors including accelerometers, such as a three-axis accelerometer integrated circuit (IC), compass devices, such as a three-axis compass IC, gyroscopic devices, such as a three-axis gyroscopic sensor IC, microprocessors, microcontrollers, ASICs, FPGAs, and/or other programmable devices, and/or satellite locations systems, such as a GPS receiving chip or module. The data from these sensors may be integrated with outputs from a set of rotational motion sensors, such as multi-axis magnetic sensors, to measure the angles of permanent magnets located at rotating joints of the ground tracking device, to provide data or information associated with movement of the locator about various axes of motion.

In addition, a surface sensing apparatus may be included to sense a characteristic of the ground or other surface adjacent to the locator and ground tracking device. For example, the surface sensing apparatus may be configured to sense the type of ground over which the locator is being moved, such as dirt, macadam, concrete, grass, or other surfaces. This may be done by using, for example, a light emitting element and/or an associated ground surface sensor, which may be a light sensor. In one embodiment, the light emitting element may be an LED emitter disposed to emit light at a wavelength or range of wavelengths suitable for surface detection. In one embodiment, the surface sensing element may be a camera or color sensor array with an associated white LED emitter which may be used to measure ground color and use this to determine various ground surfaces. By providing controlled light to the surface, the sensor array element may then detect reflected and/or ambient light and provide an output that may be used to determine a surface type, such as based on color and/or texture. An output signal from the ground surface sensor may be further processed to determine a surface characteristic, such as a surface color or texture. This may be used to determine a surface type, such as grass, concrete, dirt, macadam, or other surfaces.

Other sensor elements may also be used in various embodiments. For example, a laser altimeter or an acoustic altimeter may be incorporated for continuous acquisition of height-above-ground data during a locate operation. This may be combined with other motion sensing elements such as described subsequently herein to provide additional measurement data.

Example Ground Tracking Device Embodiments

Referring to FIG. 1A, an example ground tracking system 100 includes a measurement device, such as a portable locator 104, to track the path of a buried conductor 106 onto which an electromagnetic signal 108 of a known frequency has been actively imposed by a transmitter or sonde (not illustrated), or alternatively which carries an electromagnetic signal that can be passively detected by the locator 104, such as a signal generated by a current in a buried electrical power transmission cable. Examples of portable locators include battery powered man portable utility locators such as those described in the related applications, including exemplary locator devices as described in U.S. Pat. No. 7,009, 399, entitled OMNIDIRECTIONAL SONDE AND LINE LOCATOR, issued Mar. 7, 2006; U.S. Pat. No. 7,332,091, entitled PROCESS FOR TREATING STORM WATER, issued Feb. 19, 2008; and U.S. Pat. No. 7,733,077, entitled MULTI-SENSOR MAPPING OMNIDIRECTIONAL SONDE AND LINE LOCATORS AND TRANSMITTER USED THEREWITH, issued Jun. 8, 2010. The content of each of these applications is hereby incorporated by reference herein in its entirety for all purposes. Although the example system 100 shown in FIG. 1A is illustrated and described with respect to a particular type of buried object locator as shown, it will be apparent that the ground tracking device embodiments as shown and described subsequently herein may be adapted to be used with other types of test and measurements devices in addition to the specific buried object locator shown.

Figure 1E:
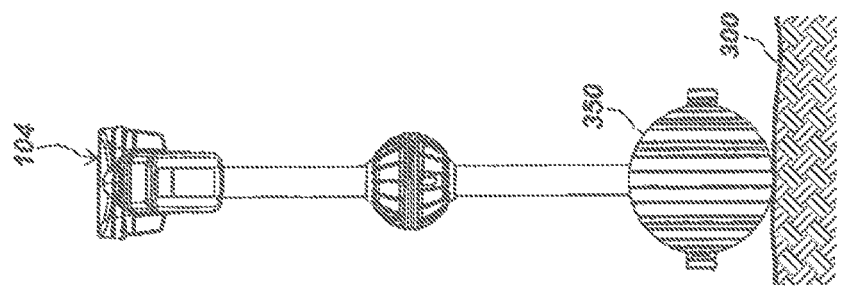
FIG. 1E illustrates details of an embodiment of a ground tracking device including a spherical ground following element in accordance with aspects of the present disclosure.
Figure 1E:
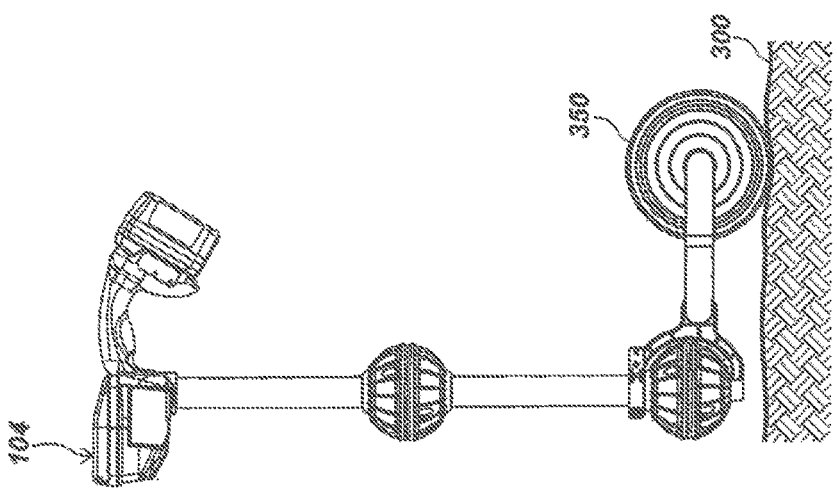
Figure 2:
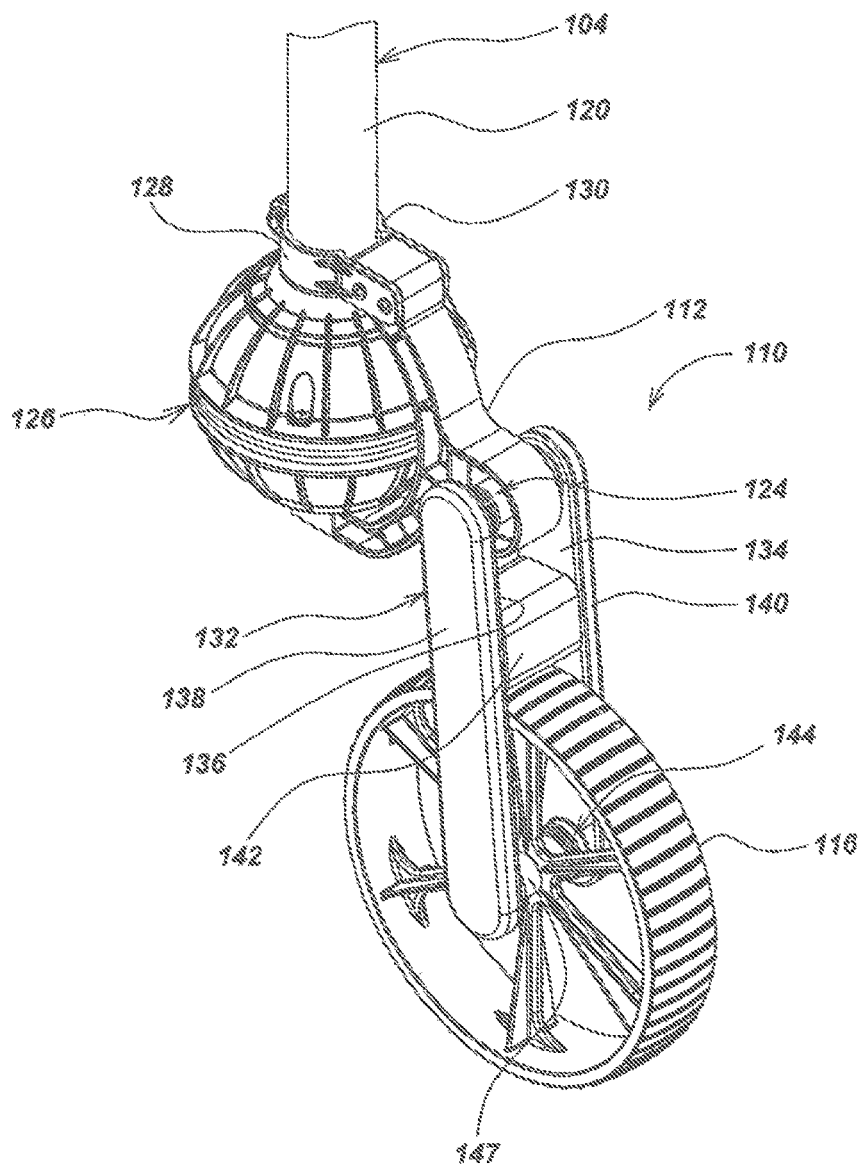
FIG. 2 is an enlarged rear isometric view of the exterior of the ground tracking system embodiment of FIG. 1A illustrating external components.

In a typical ground tracking system 100, a ground tracking device, such as the ground tracking device embodiment 110 shown in FIGS. 1A and 2 (comprising a ground follower assembly including the wheel 116, swing arm 132, yoke 112, sensing elements associated with these elements, as well as associated mechanical and electronic components, and a mounting assembly including brackets 128 and 130) may be attached to a locator 104 to follow the ground or other surfaces and provide sensed data with respect to multiple positions and movements of the locator 104 relative to the ground or other surface. Various other embodiments of ground tracking devices may be used in different implementations, such as the single wheel embodiments shown in FIGS. 1A and 2, the dual wheel embodiment shown in FIGS. 11 and 12, or other embodiments, such as the spheroid embodiment shown in FIG. 1E.

In the exemplary embodiment shown in FIG. 1A, the ground follower assembly includes a ground follower element, such as wheel 116, associated sensor elements to detect position and/or motion about two or more axes of motion of the ground follower assembly, as well as floatable elements, such as one or more yokes, along with associated elements, such as bearings and related elements to couple the ground follower assembly to the mounting assembly. Other ground follower assembly embodiments may include multiple wheels as ground followers, and/or other ground follower elements, such as the spheroid element 350 shown in FIG. 1E. In operation, the ground tracking device is configured to follow a ground surface 300 through contact between the ground follower element and the ground or other surface and generate signals corresponding to position and/or motion of the attached measurement device, such as locator 104, over and/or relative to the ground surface in two or more axes or directions of motion.

For example, FIG. 1B illustrates one type of motion of a locator 104 and attached ground tracking device, such as ground tracking device 110, relative to a substantially fixed reference point on the ground or other surface. In this example, shown as a top or bird's eye view looking down on the locator 104 and ground tracking device 110, the ground or other surface being followed may be defined by X and Y axes as shown. An operator (not shown) may rotate the locator about a substantially fixed reference point 310 in the X-Y plane (i.e. on the ground or other surface), with the ground tracking device providing data or information for use in measuring the position and/or motion of the locator about the reference point 310. In operation, the operator may start the measurement process as shown in orientation 100B-1 at Position 1, and then rotate the locator through an angle such as angle $\phi 1$ or $\phi 2$ as shown to new orientations 100B-2 (Position 2) or 100B-3 (Position 3), respectively. This rotational motion may be sensed and a corresponding output signal generated. Yoke sensor element configurations, such as described subsequently herein, may be used to sense this motion.

Figure 11:
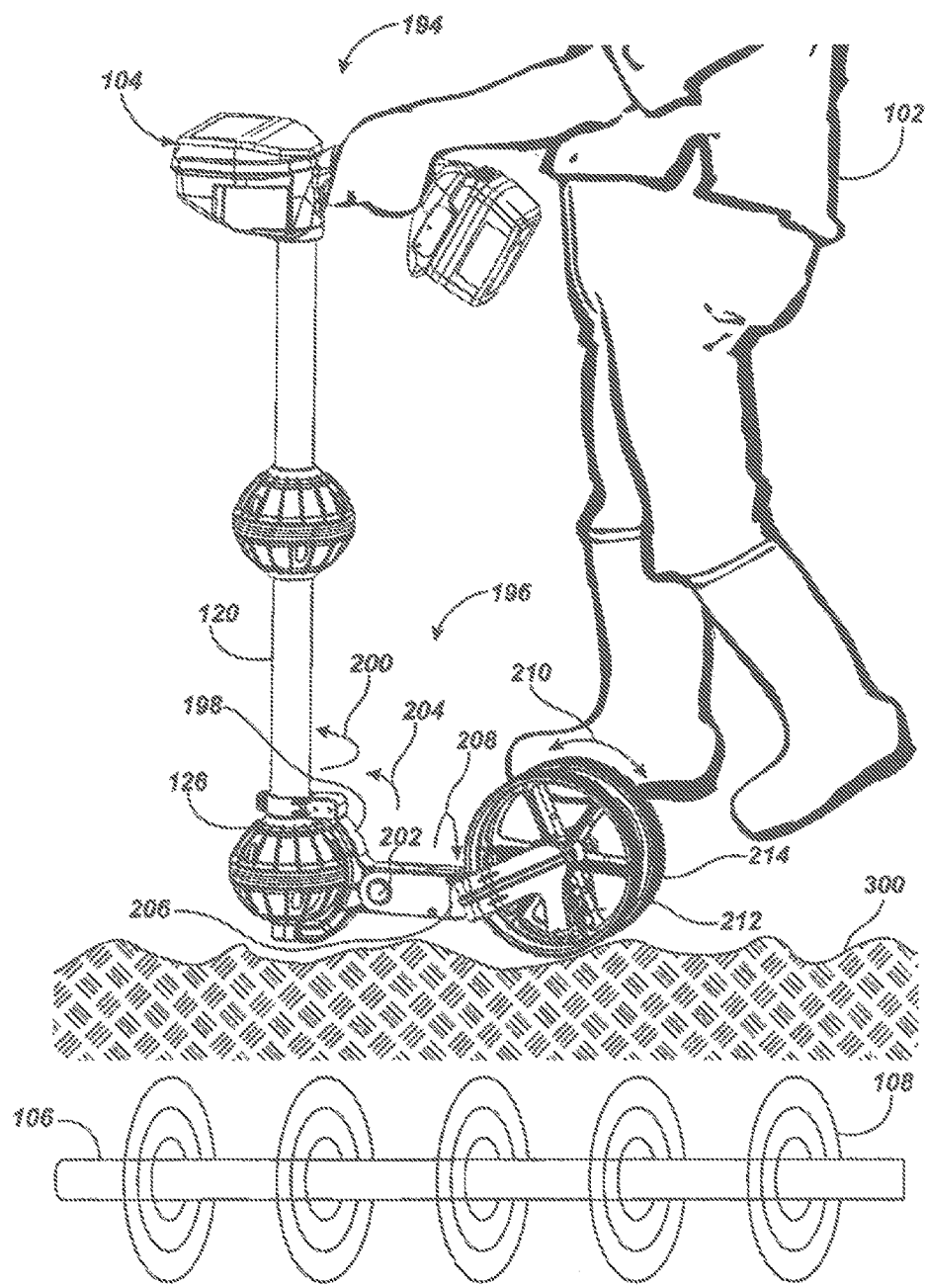
FIG. 11 is a diagrammatic illustration of another embodiment of a ground tracking system including a ground tracking device and a locator in accordance with aspects of the present disclosure.

The associated position and/or motion of the locator 104 may be determined at least in part from output signals provided from the ground tracking device, such as by sensing positions and/or movements in X and Y axes and/or angular rotations such as $\phi 1$ or $\phi 2$ and generating corresponding signals (which may correspond to motion 118 as shown in FIG. 1A or motion 200 as shown in FIG. 11). In the embodiment shown, wheel 116 will typically pivot somewhat about reference point 310 and may move slightly in the X and Y dimensions. In other embodiments, such as the two-wheel embodiment shown in FIGS. 11 and 12, the two wheels 212 and 214 may rotate in opposite directions during movements as shown in FIG. 1D (where reference point 310 is located between the two wheels), which may minimize displacement of the ground tracking device from the reference point 310.

Figure 1C:
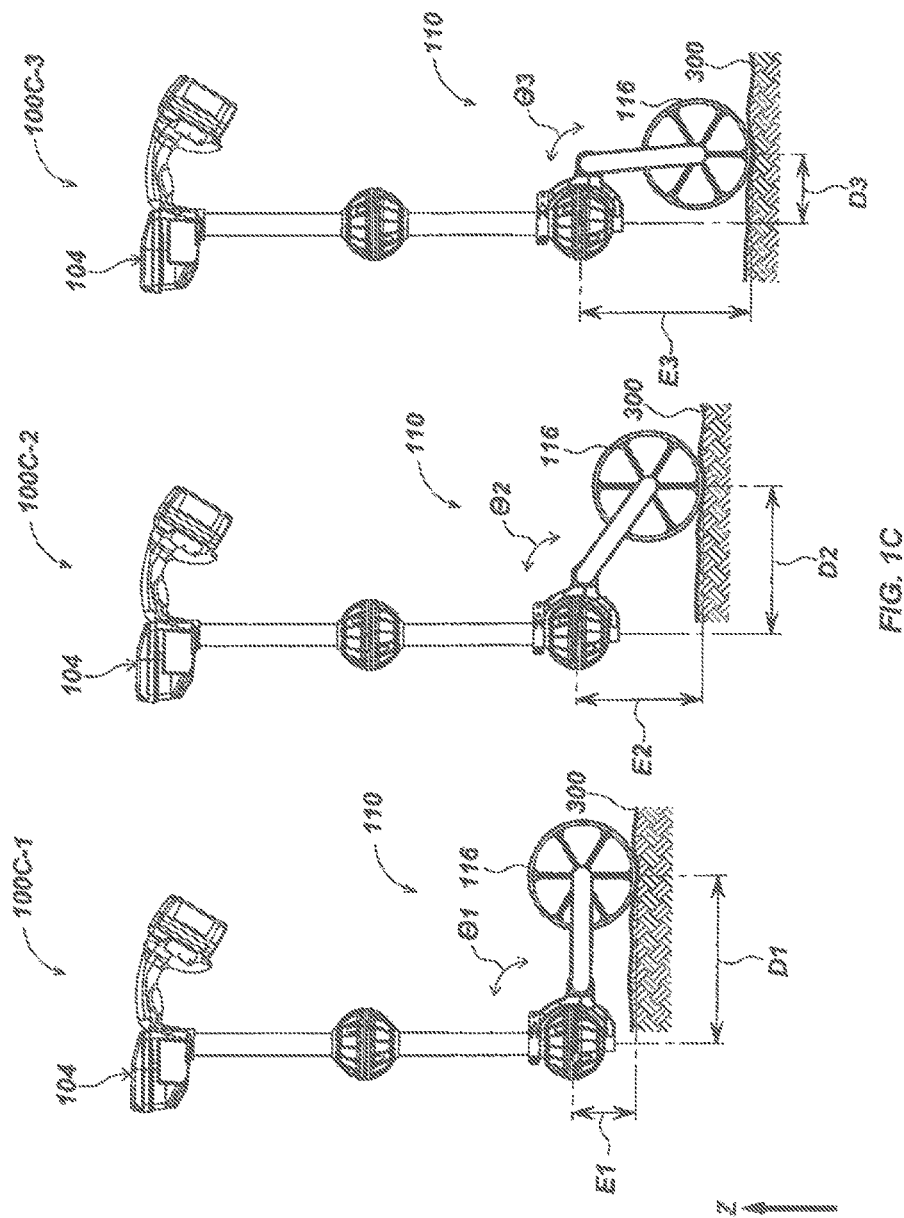
FIG. 1C illustrates details of example movements of a locator and attached ground tracking device in up/down directions or elevations above a ground or other surface in accordance with aspects of the present disclosure.

FIG. 1C illustrates up/down elevation movements that may be sensed by a ground tracking device such as shown in FIG. 1A. These rotational motions may be sensed by a sensor element and a corresponding output signal may be generated. Swing arm sensor configurations as described subsequently herein may be used to sense this motion. In orientation 100C-1, the locator 104 (where a lower antenna ball is a reference position on the locator device) is positioned at a bottom position relative to the ground surface 300. In this position, the angle $\Theta 1$ between a swing arm assembly of the ground tracking device 110 is approximately 90 degrees from the locator mast and may be sensed to determine the elevation, E1, of the locator in an up-down orientation (elevation in a Z dimension) relative to the ground surface 300. A corresponding distance D1 from the ground follower element (in this embodiment, wheel 116) may also be determined. Similarly, in orientations 100C-2 and 100C-3, respective angles $\Theta 2$ and $\Theta 3$ may be measured to determine corresponding heights or elevations E2 and E3 of the locator 104 above the ground surface 300.

Figure 1D:
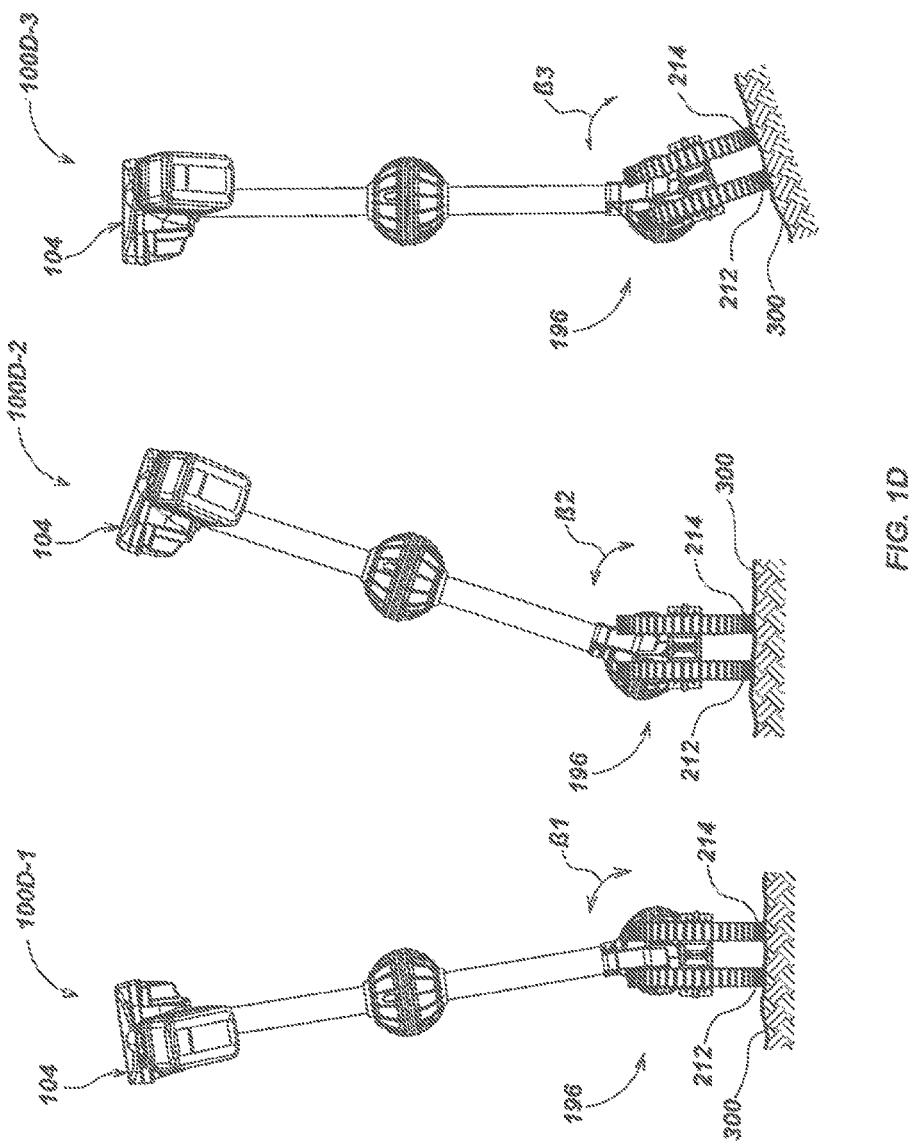
FIG. 1D illustrates details of example side-to-side movements of a locator and attached ground tracking device in accordance with aspects of the present disclosure

FIG. 1D illustrates an example of side-to-side movements that may likewise be measured in some embodiments. As shown in FIG. 1D, a two wheel ground follower assembly may be better suited for determining side-to-side measurements, which may be determined based on measurement of angles such as $\beta 1$, $\beta 2$, or $\beta 3$.

Although the embodiments shown in FIG. 1A and FIG. 11 include wheels, such as wheel 116 or wheels 212 and 214, in the ground follower assembly, in some embodiments other ground following elements may be used. For example, FIG. 1E illustrates one embodiment using a spheroid ground following element 350 to follow the ground surface 300. In embodiments using wheels or similar elements, one or more wheels of different widths, diameters, and/or numbers may be used, and the wheels may be configured with treads of varying widths and shapes, such as treads curved or otherwise shaped to follow the ground or other targeted surfaces. Some embodiments may use other mechanical elements and associated sensors to follow the ground and provide motion signals corresponding to motions such as those shown in FIGS. 1B, 1C, and 1D to an attached measurement device, such as locator 104. For example, some embodiments may use extended arms, pointers, or other apparatus to substantially follow a ground surface or other surface during a buried object tracing or other measurement process.

Returning to FIG. 1A, in an exemplary embodiment, ground tracking device 110 includes a ground follower assembly including a wheel 116, and a yoke 112, which may be in a C-shape configuration as shown and/or in other similar or equivalent configurations. The ground tracking device 110 may be coupled to a mast 120 of the locator as shown.

In the embodiment shown in FIG. 1A, the ground tracking device 110 has freedom of motion around multiple axes of motion or pivot points, including a rotary motion 114 around the axle of wheel 116 to provide sensing of directional or translational motion along the ground or other surface; a rotary motion 118, corresponding to the movements illustrated in FIG. 1B in X and Y dimensions, around a vertical axis of the locator 104, such as about the vertical mast 120 or other measurement device centerline, which may be implemented by a C-shaped yoke mechanism 112 (or other similar or equivalent mechanism); as well as a rotary motion 122 of a connecting arm assembly, corresponding to the up/down motion or elevation in a Z dimension, as shown in FIG. 1C, which may be implemented using a yoke joint assembly 124 positioned at the midsection of the C-shaped yoke 112 (or via other mechanisms to effect similar up/down movements as shown in FIG. 1C). Typical measurement device movements may include combinations of two or more movements.

For each of these degrees of freedom of motion, signals and/or data corresponding to positions and/or movements of the locator 104 (or other measurement device) in the various axes or dimensions of motion may be generated by sensors configured to measure the corresponding movements. The sensed signals may be measured in X, Y and Z dimensions and distances and/or in angular measurements, or in combinations of both. The sensed signals may be analog or digital signals in various embodiments.

Figure 5:
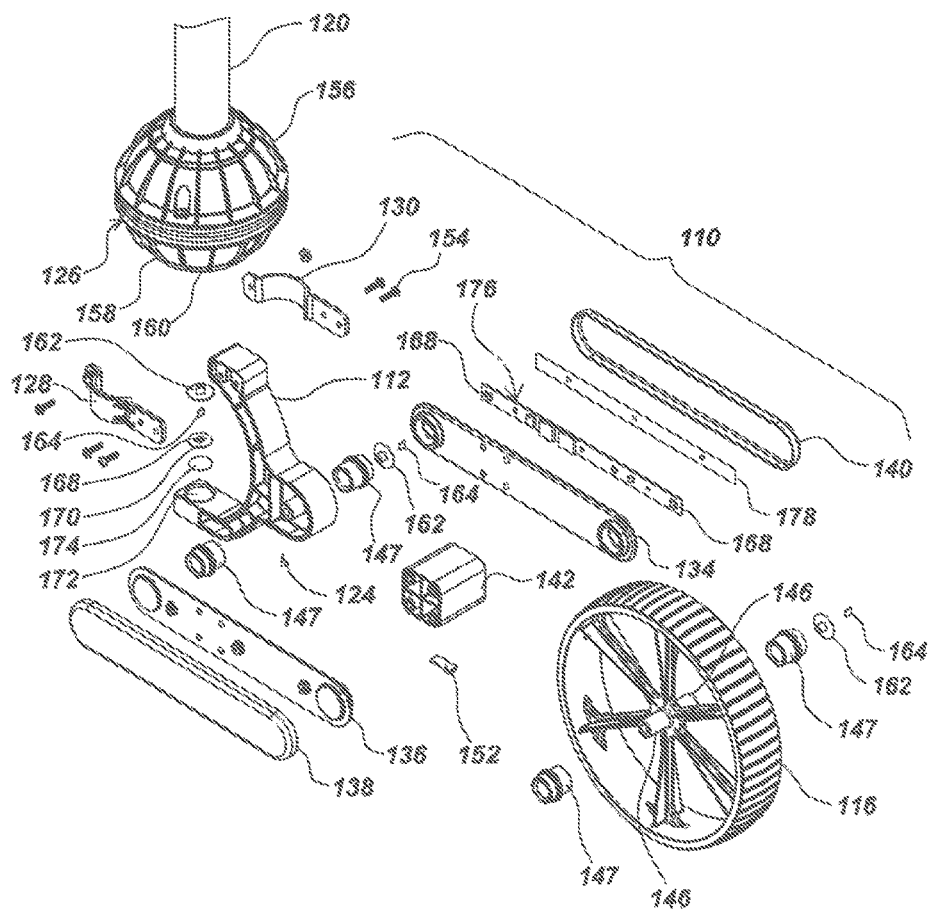
FIG. 5 is an exploded isometric view of the embodiment of FIG. 2.

In an exemplary embodiment, sensors may be located approximately at each pivot point, such as that shown in FIG. 5, to generate position and/or motion signals. The sensed signals may then be processed in a measurement circuit (not shown) in the ground tracking device, with processed output signals then provided to the locator 104. In some embodiments, the sensed motion signals may be processed in whole or in part in the measurement circuit, with processed data or information sent to the locator 104. However, in other embodiments the sensed motion signals may be provided directly from the ground tracking device to the measurement device and processed in the measurement device.

The measured motion signals corresponding to the various axes of motion may then be used to calculate and map position, motion, location, orientation, and/or terrain data or information associated with movements of locator 104 by operator 102. Signals provided from the ground tracking device may be combined or processed in combination with additional signals provided from the locator to generate the position and/or movement data as well as to generate mapping data for the locating or tracing procedure. For example, accelerometer or other motion sensing devices in a locator may be combined with motion signals from the ground tracking device to distinguish relative movements associated with the locator from movements generated by sensors in the ground tracking device. This can be used to generate more complete mapping data reflecting position and movements of the combined locator/ground tracking device (or other measurement instruments combined with a corresponding ground tracking device). The data may be stored in the ground tracking device and/or locator or other instrument for subsequent download and/or processing, such as in a separate computer system.

In an exemplary embodiment, the sensors may comprise magnetic sensors and associated permanent magnets to generate position and/or motion signals. However, in some embodiments optical encoders, potentiometers, gyroscopic devices, compass devices, and/or other sensor elements and associated hardware and signal processing circuits may be used to sense relative position and motion, such as described subsequently herein.

Referring to FIG. 2, additional details of the embodiment of FIG. 1 are illustrated. As shown in FIG. 1, an exemplary locator such as locator 104 may have a spherical lower antenna enclosure 126 secured to a cylindrical locator mast 120. A yoke mechanism, such as C-shaped yoke 112, may be secured around the locator mast 120 above the lower antenna enclosure 126 and may be further coupled to the bottom of the lower antenna enclosure 126 or to other lower measurement device structures. The yoke 112 may be configured in an approximately C-shaped configuration and may be coupled to the locator mast 120 (or other similar or equivalent structures of other locators or measurement devices) by a mounting assembly, which may include a left yoke bracket 128 and a right yoke bracket 130, or other mounting apparatus. In an exemplary embodiment, the mounting assembly may be detachable so that the ground tracking device may be readily attached or removed from the measurement device; however, in some embodiments the measurement device and ground tracking device may be coupled in a more fixed configuration.

To facilitate movements such as those shown in FIG. 1B, the C-shaped yoke 112 may be configured so as to freely rotate around the vertical axis of the locator mast 120 and of the lower antenna enclosure 126, or about another centerline of a measurement device. A yoke sensor may be used to sense this motion.

In the exemplary embodiment illustrated, at the midsection of the C-shaped yoke 112, a yoke joint assembly 124 may be formed to which a swing arm assembly, such as swing arm structure 132, may be attached. The swing arm assembly may include one or more arm elements or other floatable supporting elements. In an exemplary embodiment, the swing arm assembly includes a right arm half 134 and a left arm half 136, operably coupled such that the swing arm structure 132 provides a floating link that rotates around the horizontal axis of the yoke joint assembly 124. However, other configurations may include single arms or other elements to floatably couple a wheel or other ground tracking element. The left arm half 136 may be covered by a left plastic arm cap 138, and the right arm half 134 may be covered by a right plastic arm cap 140. The arm structure 132 may also incorporate an intermediate supporting structure, such as molded mounting block 142, to provide rigidity and structural strength to the arm structure 132.

FIG. 2 shows ground tracking device 110 rotated into a vertical alignment with locator 104 (for purposes of illustration). However, in typical use, ground tracking device 104 would be operated at approximately a ninety-degree angle to the locator 104, as illustrated in FIG. 1A, and may be moved in the various motions as shown in FIG. 1B, FIG. 1C, and/or FIG. 1D during operation. For example, if the locator 104 is lifted to clear an obstacle, the ground tracking device 110 will move into a nearly vertical position as illustrated in FIG. 2. The vertical configuration shown in FIG. 2 may also be used for storage, etc., and a locking mechanism (not shown) may be included to lock the ground tracking device 110 into a locked position relative to the locator 104.

At the lower end of the arm structure 132 a wheel hub assembly 144 may be used to provide a wheel bearing axle 146 (illustrated in FIG. 5, but obscured in FIG. 2 by axle bushing 147) to facilitate rotation of wheel 116. The wheel 116 may rotate around a central axis of the wheel hub assembly 144. Rotational motion of the wheel 116 about the central axis may be sensed by a wheel sensor element and used to generate signals and/or data corresponding to movement of the wheel across the ground or other surface.

Figure 3:
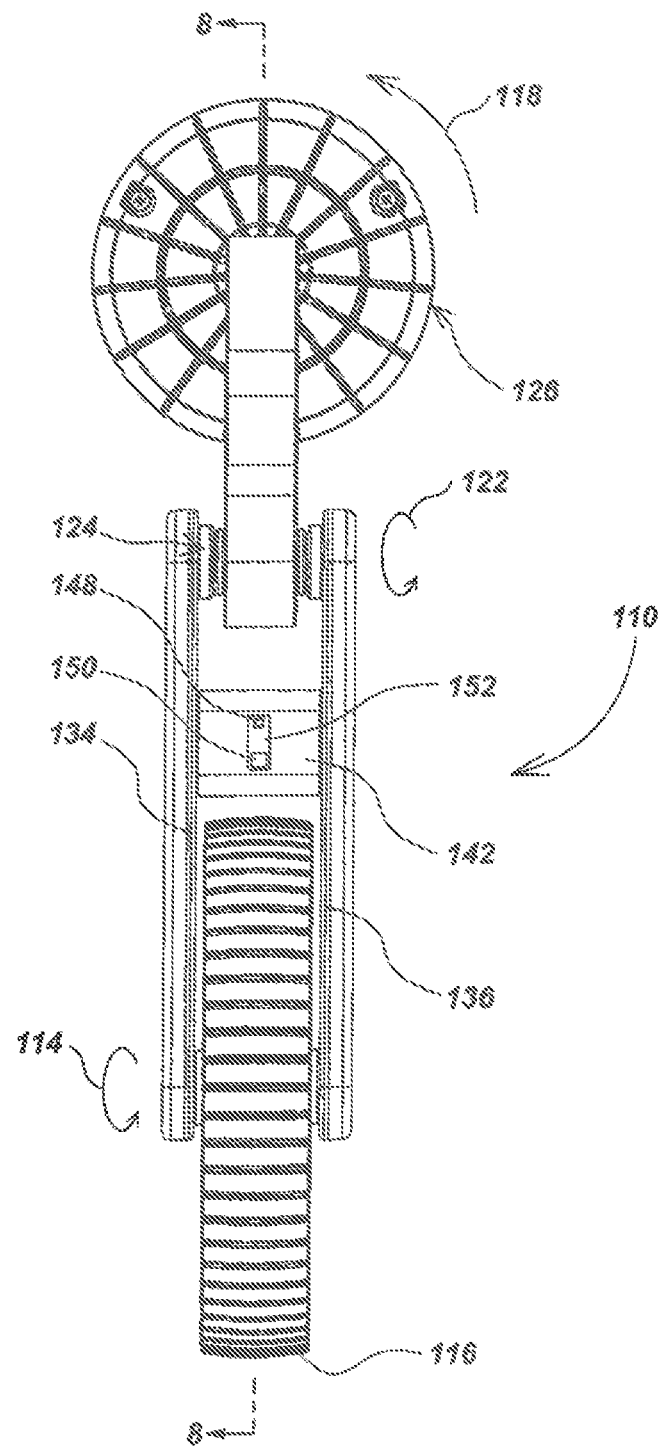
FIG. 3 and FIG. 4 are enlarged bottom elevation and side elevation views, respectively, illustrating example degrees of freedom of motion of the embodiment of FIG. 1A.
Figure 4:
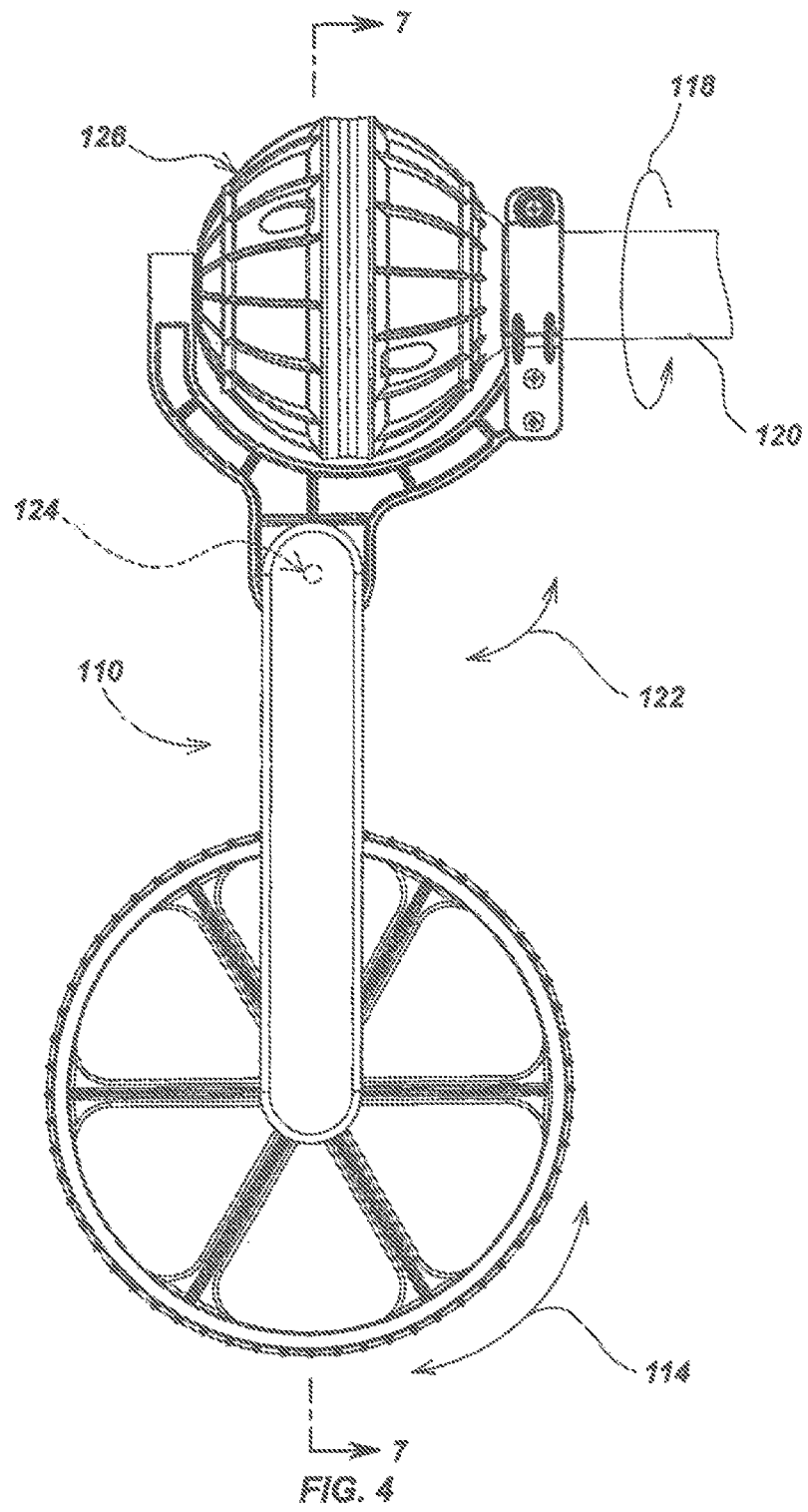

FIG. 3 and FIG. 4 illustrate example pivot points and their corresponding degrees of freedom for the exemplary ground tracking device embodiment 110. FIG. 3 illustrates a view of the ground tracking device 110 and locator 104 looking upward from below, such as would be seen looking upward from the ground during a locate operation. The rotary motion 118 illustrates rotation of the ground tracking device 110 around a vertical axis of the lower antenna enclosure 126 and the locator mast 120 (as shown in FIGS. 1A and 2), such as is shown in the example movements of FIG. 1B. The rotary motion 114 indicates the rotary motion around the axle of the wheel 116, such as when the wheel is being rolled across the ground or other surface. The rotary motion 122 indicates a vertical rotation of the ground tracking device 110 around the horizontal axis of the yoke joint assembly 124, such as to facilitate the up/down elevation motion as shown in FIG. 1C.

In some embodiments, a surface sensing apparatus may be included to sense the type of ground or other surface over which the measurement device and ground tracking device are being moved. For example, in an exemplary embodiment a lighting element and ground sensor element may be mounted on the ground tracking device, such as on a lower surface of mounting block 142 as shown. The lighting element may be, for example, a white LED 148, which may be mounted adjacent to an optical sensor 150. The optical sensor may be, for example, a single-pixel optical sensor (four sub-pixels) device such as the Avago ADJD-S311-CR999 RGB color sensor. Alternately, optical sensors with other pixel configurations, such as a sensor with four pixels (16 sub-pixels) such as the TAOS TCS3404 or 3414 may be used. In some cases, the sensor element may be passively configured so that no specific lighting element is used and the sensor processes ambient light. In various configurations, other types of lighting elements and sensors may be used, such as lighting elements and sensors operating in various visible light, infra-red, ultra-violet, or at other wavelengths. Other sensor devices capable of measuring a characteristic of the ground or other surface may alternately be used, such as, for example, acoustic sensors.

In operation, the lighting element and sensor may be configured to provide simple color differentiation among ground types. For example, the white LED 148 and the optical sensor 150 may be mounted on an inset optical sensor printed circuit board (PCB) 152. In operation the white LED 148 strobes or energizes a white light, either continuously during a locate or tracking operation or at fixed or varying time intervals. The optical sensor 150 generates a signal or data based on received light that is reflected from the ground surface. Signals or data generated by the optical sensor 150 may then be processed to make a determination as to the type of different surfaces (e.g. grass, asphalt or macadam, concrete, dirt, etc.). The determination may be based on, for example, detection of color, texture, or other characteristics of the surface. In addition, other characteristics, such as color marks, lines or other markings, such as spray-painted marks, etc., may be detected by the surface sensing apparatus and may be stored and/or combined with other sensed data or information to improve mapping.

For example, in one embodiment, the surface determination data or information may be used to improve the accuracy of correlation between locator detections in various positions and photographs or other imaging information, such as digitized maps or aerial images, in which surface colors are visible or are otherwise identified. It another aspect, surface determination data may be used to allow the locator to identify a particular color of a paint marking that has been applied to the ground or other surface to correlate with water pipes, electric lines, cable TV cables, etc. (e.g., where color-coded marks are used to identify various utilities). In some embodiments, optional optical control elements (not illustrated) may be used to control the field of view of the sensor, such as optical sensor 150, and/or the output power, beam angle, emitted light wavelength, and/or other characteristics of the lighting element (such as white LED 148).

In some embodiments, the sensor may be a camera/photo sensor, such as a digital camera device which enables more complex ground pattern recognition. For example, if an image sensor such as a VGA or higher resolution sensor is used, features such as edge recognition, shape detection, image integration, and/or other image processing functions may be implemented, such as through use of a feature transform photo-stitching algorithm, edge or shape detection algorithm, or other image processing algorithm.

Referring to FIG. 5, the C-shaped yoke 112 may be secured around the locator mast 120 above the lower antenna enclosure 126 using brackets, such as left yoke bracket 128 and yoke bracket 130 and a set of screws such as screws 154, or via other attachment mechanism. The lower antenna enclosure 126 of the locator 104 (FIG. 1) may be configured with an outer shell consisting of an upper shell half 156 and a lower shell half 158 as shown. An adaptor port 160 (partially obscured in FIG. 5) may be molded into the bottom of the lower shell half 158 in alignment with the vertical axis of the lower antenna enclosure 126 and the locator mast 120. However, in some embodiments, different attachment mechanisms configured to removably or fixedly attach the ground tracking device to the locator or other measurement device may be used.

In an exemplary embodiment, at each pivot point of the ground tracking device 110 (as shown in FIG. 1) a magnetically permeable magnetic shield 162 and a permanent magnet 164 associated with the pivot point may be located on one of the joined components. For example, an instance of the magnetic shield 162 and the permanent magnet 164 may be located embedded within the molded adaptor port 160 as shown. The magnetic shield 162 and the permanent magnet 164 associated with the wheel hub assembly 144 (as seen in FIG. 2) may be located in the molded center of a bushing 147 seated on the right side of the wheel bearing 146 of the wheel 116 and fixed relative to the wheel 116. A magnetic shield 162 and permanent magnet 164 associated with the yoke joint assembly 124 may be seated in the bushing 147 of the right side of the yoke joint assembly 124, and may be centrally aligned with the axis of the yoke joint assembly 124, fixed relative to the C-shaped yoke 112. Multiple magnetic shields 162 may be used to prevent the magnetic field of associated permanent magnets 164 from interfering with the detection of the electromagnetic signal 108 (as shown in FIG. 1) being transmitted from the buried object (such as the buried conductor 106 of FIG. 1).

Figure 19:
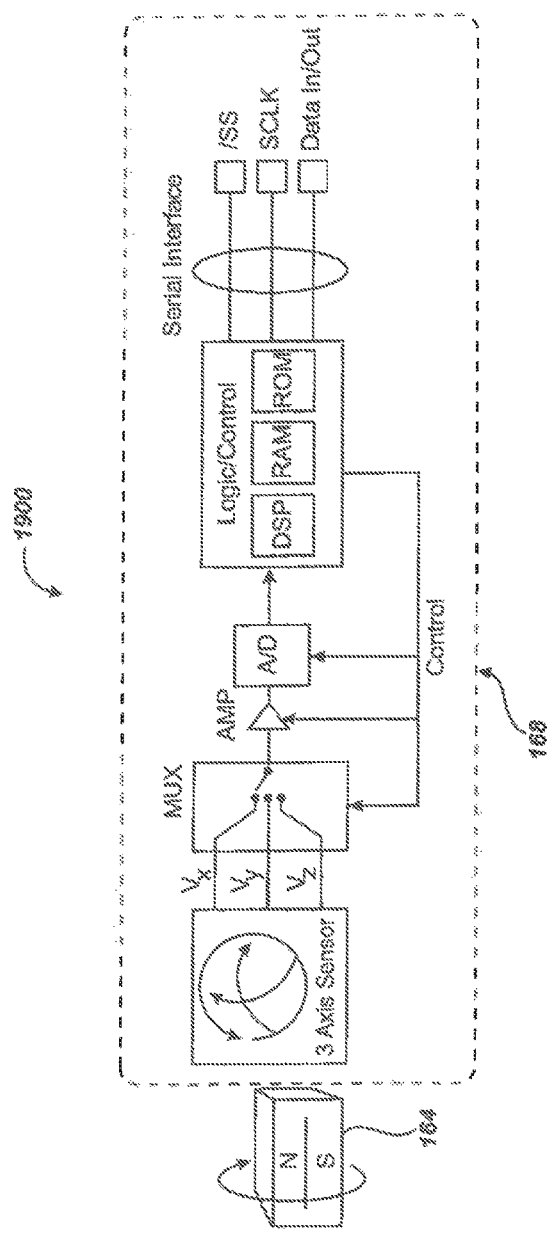
FIG. 19 is a schematic block diagram illustrating the relationship between an individual magnet and the three-axis magnetic sensor utilized in the embodiments of FIGS. 1 and 11.

The permanent magnets 164 and the magnetic shields 162 may be mounted on-axis at the pivot points to facilitate motion sensing. For example, a three-axis magnetic sensor 168 (such as the single die version of a Melexis MLX90333 sensor, for example) may be attached to a printed circuit board and backed with foil shielding tape. The magnetic sensor may be mounted in close proximity to a corresponding magnet, but on the other component of each joint. Further details regarding the example Melexis MLX90333 sensor may be found in U.S. patent application Ser. No. 12/756,068 entitled MAGNETIC MANUAL USER INTERFACE DEVICES, filed Apr. 7, 2010. The content of this application is hereby incorporated by reference herein in its entirety for all purposes. Additional details are also shown in FIG. 19.

One or more magnetic sensors 168 may be associated with the adapter port 160 and may be mounted on a sensor PCB 170 at the center of a molded receptacle 172 in the lower arm of the C-shaped yoke 112, fixed relative to the C-shaped yoke 112. This magnet and sensor may be used to facilitate sensing of fixed ground point rotation motions, such as those illustrated in FIG. 1B. The sensor PCB 170 may be backed by a layer of metallic foil backing 174 for additional shielding.

Figure 6:
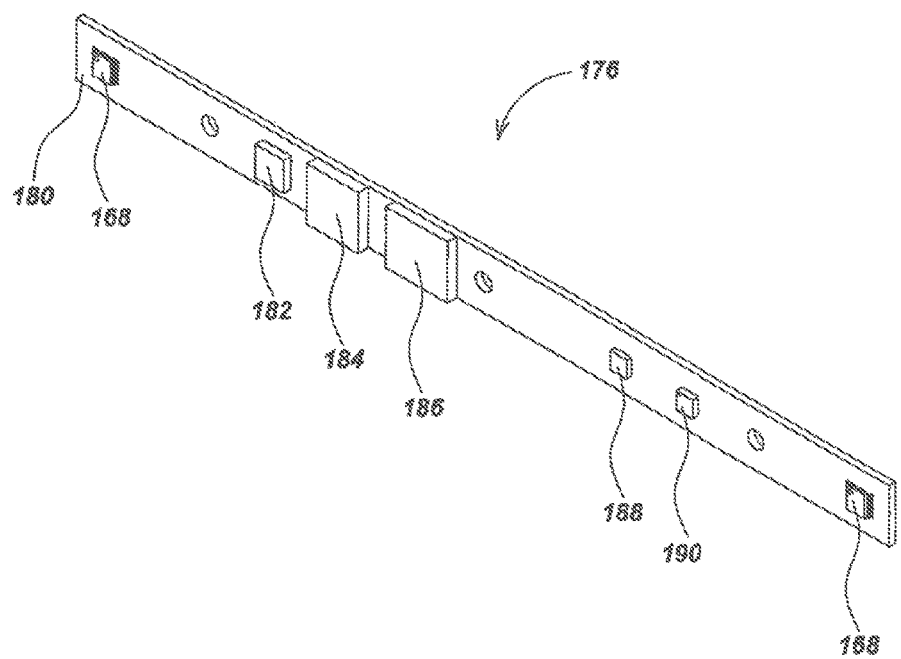
FIG. 6 is an isometric view of a main printed circuit board (PCB) of the embodiment of FIG. 5.

One or more magnetic sensors 168 corresponding to the magnets 164 associated with the wheel hub assembly 144 (as shown in FIG. 2) and the yoke joint assembly 124 may be mounted on an arm PCB assembly 176, one example of which is further illustrated in detail in FIG. 6. This magnet and sensor configuration may be used to sense rolling motion of the ground tracking device across the ground or other surface. A strip of metallic foil backing 178 may be attached adhesively to the back of the arm PCB assembly 176 to provide additional magnetic shielding.

In an exemplary embodiment, each of the permanent magnets 164 may be precisely keyed in its polar orientation relative to the X, Y and Z axes of the ground tracking device 110 (as shown in FIG. 1). Example illustrations of the relationship between the magnetic shields 162, the permanent magnets 164, and the magnetic sensors 168 are detailed in FIGS. 9 and 10. In this configuration, angles measured by the magnetic sensors 168 may be measured continuously or periodically (e.g., sampled) to enable determination of motion over the ground, orientation, and height above ground for the locator 104 (or other measurement device). Each instance of the magnetic shield 162 may contain an embedded permanent magnet 164, which may be rectangular in shape in an exemplary embodiment. The permanent magnet 164 may be situated within the magnetic shield 162 so that its dipole axis centerline precisely aligns with the axis of rotation of its corresponding joint.

Referring to FIG. 6, the arm PCB assembly 176 may include an arm PCB 180 on which a plurality of sensors may be mounted. These may include a magnetic sensor 168 associated with a permanent magnet 164 for sensing at the yoke joint assembly 124 (as shown in FIG. 5) and a magnetic sensor 168 associated with a permanent magnet 164 for sensing at the wheel 116 (as shown in FIG. 5). The arm PCB 180 may optionally mount a processor element, such as a microcontroller 182 or other programmable processing element, a gyroscopic sensor device, such as a three-axis gyroscopic sensor IC 184, a satellite position sensing device, such as a GPS module 186, a compass device, such as three-axis compass IC 188, as well as an accelerometer, such as a three-axis accelerometer IC 190. Signals or data generated from the sensors mounted on the arm PCB 180, as well as other sensor described herein, may be integrated and processed by computing processing circuitry built into the locator 104 (FIG. 1) or the microcontroller or other processor 182, or both. The data or information may then be sent to other computing devices for further integration and/or processing.

Figure 7:
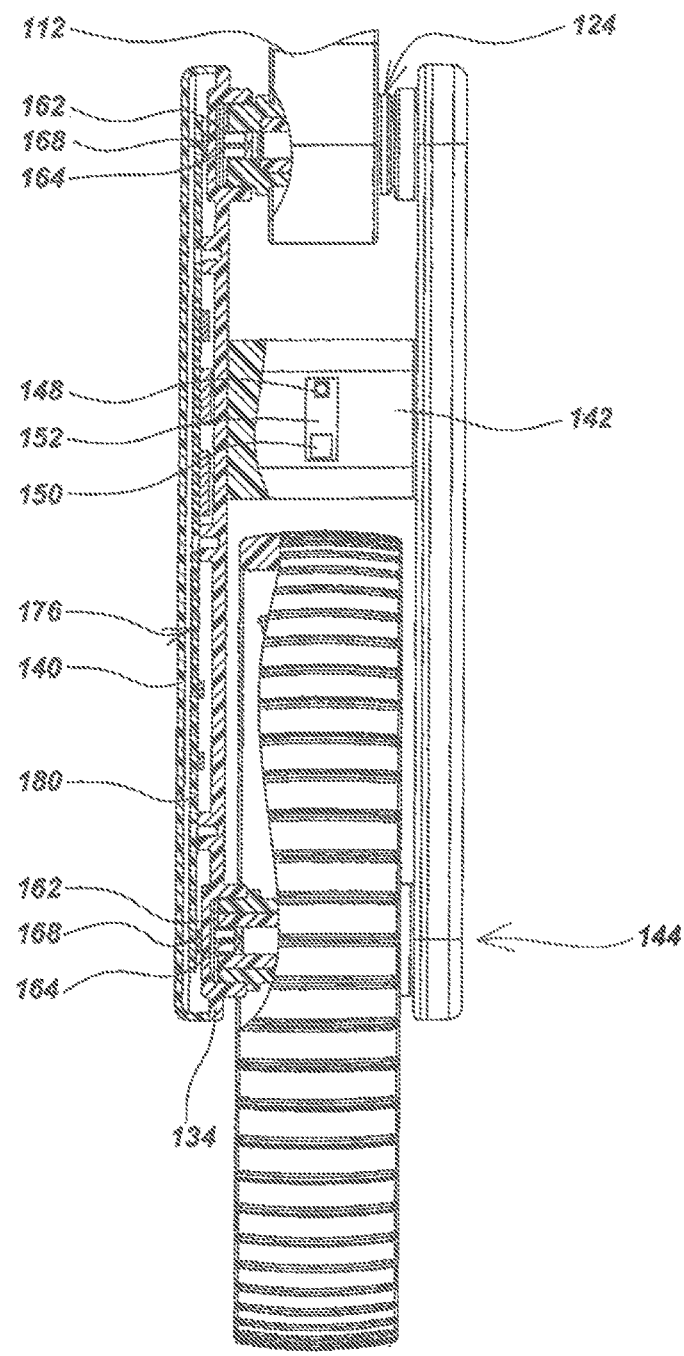
FIG. 7 is a fragmentary bottom plan section view taken along line 7-7 of the embodiment of FIG. 4, illustrating the location of a sensor and shielded magnet at two of the pivot points.

As shown in FIG. 7, a magnetic shield 162 and a permanent magnet 164 associated with the wheel hub assembly 144 may be located at the right end of the wheel hub assembly 144. A magnetic sensor 168 associated with the wheel hub assembly may be mounted on the arm PCB 180 and may be seated in a formed well in the right arm half 134 as shown.

At the right end of the yoke joint assembly 124 (as seen in FIG. 7), a permanent magnet 164 associated with the yoke joint assembly 124 may be seated in a magnetic shield 162 associated with the yoke joint assembly 124, and may be seated within the joint portion of the molded yoke 112 as shown in FIG. 7. The yoke joint's magnetic sensor 168, which may be mounted on the arm PCB 180 (e.g., part of the arm PCB assembly 176), may be seated within a formed well in the right arm half 134 below the right plastic arm cap 140. Experimental results suggest that a distance of approximately 0.05 inches between the permanent magnets 164 and their respective magnetic sensors may provide optimal performance for the particular configuration and elements shown; however, depending on the types of devices used and their configurations, other distances may alternately be used in various embodiments.

Figure 8:
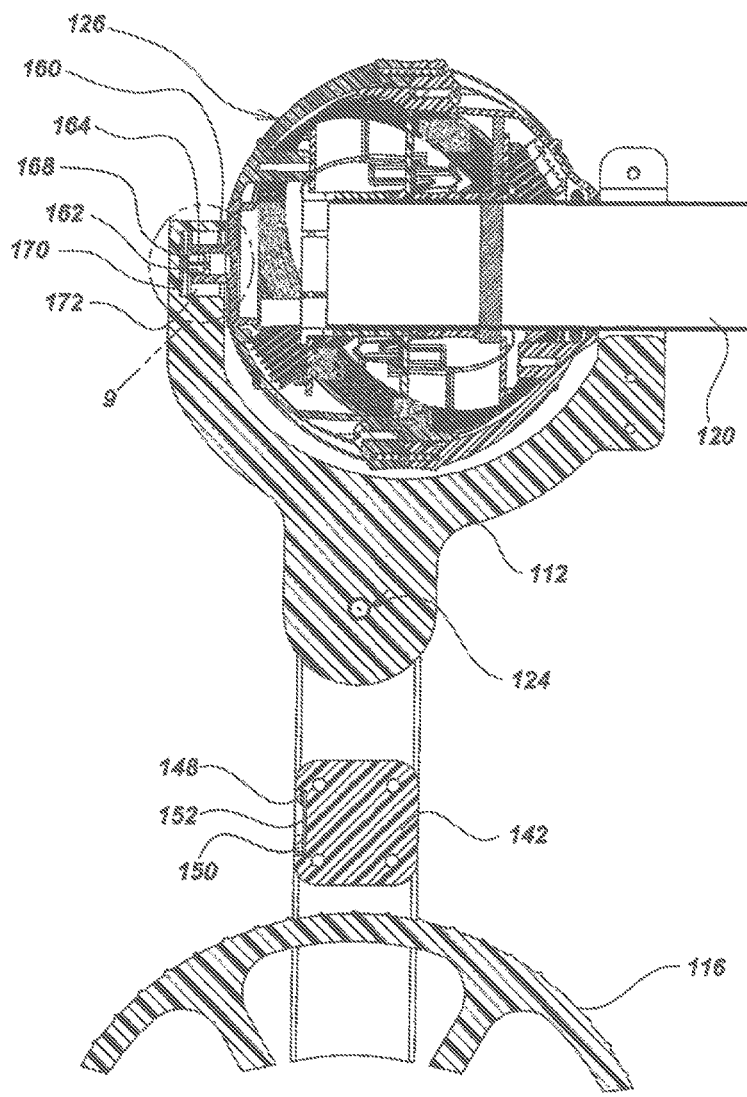
FIG. 8 is fragmentary vertical section view taken along line 8-8 of the embodiment of FIG. 3, illustrating details of the magnetic sensor arrangement where the yoke connects to the lower antenna enclosure of a locator.

Referring to FIG. 8, a lower antenna enclosure 126 mounted onto the locator mast 120 may contain an adapter port 160 in which a magnetic shield 162 and a permanent magnet 164 associated with the adaptor port 160 may be seated. A lower arm of the C-shaped yoke 112 may include a receptacle 172 positioned directly below the adaptor port 160 in which a magnetic sensor 168 may be seated on sensor PCB 170. The magnetic sensor 168 may be used to measures angles of the magnetic field of the permanent magnet 164 as the yoke 112 moves around the vertical axis of the locator mast 120, corresponding to fixed point ground rotation movements as illustrated in FIG. 1B.

Figure 9:
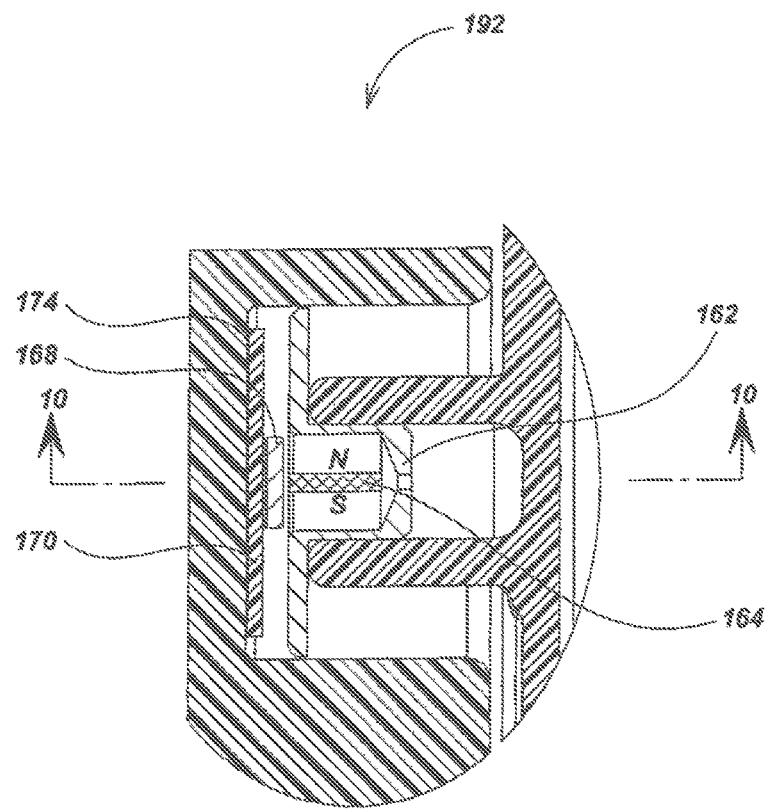
FIG. 9 is an enlarged section view of a typical sensor assembly including a magnetic sensor, magnetic shield, and permanent magnet arrangement that may be used in various embodiments to generate positional information at pivot points.
Figure 10:
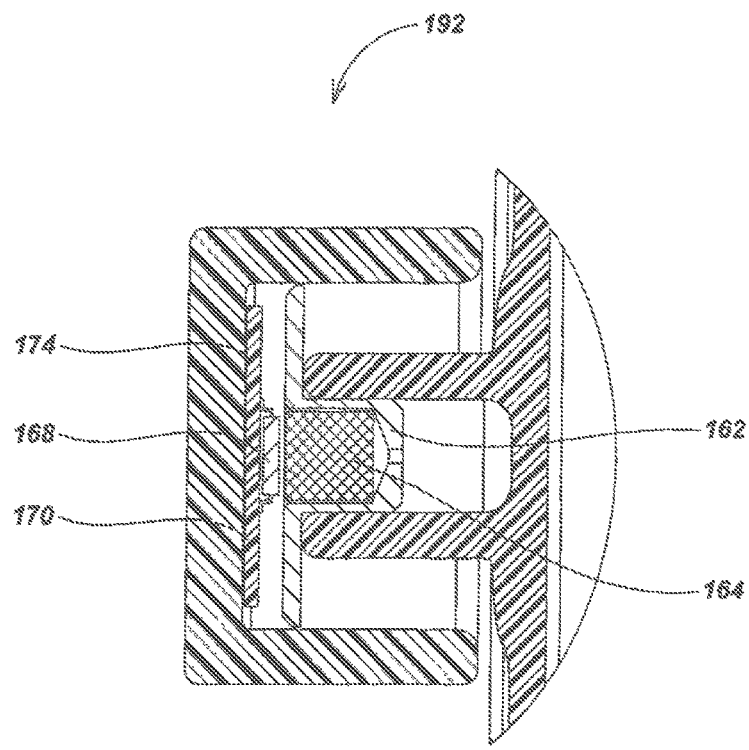
FIG. 10 is a section view taken along line 10-10 of the embodiment of FIG. 9.

Referring to FIG. 9 and FIG. 10, an embodiment of a sensor assembly 192 for measuring certain motions of a ground tracking device is shown. Sensor assembly 192 includes a magnet, a shield, a sensor, a PCB, and a foil arrangement, where the magnet may comprise a permanent magnet 164, a magnetic shield 162, and a three-axis magnetic sensor 168. In FIG. 9, the magnetic shield 162 may be configured as a cylinder of approximately 0.75 inches in diameter in which a cavity has been drilled for the insertion of a permanent magnet, which may be configured as a flat, rectangular permanent magnet 164 as shown. The magnetic shield 162 may be included to minimize magnetic interference generated from the permanent magnet 164. The permanent magnet 164 may be retained within the cavity of the magnetic shield 162 by glue or other attachment mechanisms. The magnetic sensor 168 may be mounted on the sensor PCB 170 and may be located in alignment with the centerline of the permanent magnet 164. The sensor PCB 170 may be backed with a layer of metallic foil backing 174, such as a commercially available 80% nickel alloy magnetic shielding foil, for example, to provide further shielding. In FIG. 10 the same configuration of magnet, shield, sensor, PCB and foil arrangement as shown in FIG. 9 is illustrated from a side view, sectioned through the center width of the permanent magnet 164.

Wired, slip-ring, or wireless connections may be used to communicate sensor data to the locator 104 or to other processors or signal processing circuits. For example, processed or raw sensor signals or data from the ground tracking device 110 may be transmitted to the locator 104 or to another device, such as a smart phone, notebook computer, table device, or other similar or equivalent device by wired or wireless mechanisms, such as via a USB interface, BlueTooth™ or other wireless interface, or other wired or wireless connection. Adaptor port 160 (as shown in FIG. 8) may include a slack wired loop or electrical slip ring assembly (not illustrated) to provide power and/or data connections between the locator 104 and ground tracking device 110. An example of one sling ring assembly that can be adapted for providing a plurality of conductive paths between the locator 104 and the ground tracking device 110 for transmitting data and power is described in U.S. Pat. No. 6,908,310, entitled SLIP RING ASSEMBLY WITH INTEGRAL POSITION ENCODER, issued Jun. 21, 2005. The content of this application is hereby incorporated by reference herein in its entirety for all purposes. Alternatively, a slack wire loop allowing partial rotation around the locator mast 120 (as shown in FIG. 5), or an electrical slip ring assembly (not illustrated) may be used between the upper portion of the C-shaped yoke 112 and the locator mast 120 to allow continuous unrestricted rotation of the ground tracking device 110 around locator mast 120.

Ground tracking devices such as ground tracking device 110 may be battery powered by an internal removable battery (not illustrated) or may be powered by a battery in the locator 104, such as is shown in FIG. 1A. Sensor data can be transmitted to an external remote device by signal connection apparatus such as Wi-Fi, BlueTooth, IR, acoustic, or radio transmitters and receivers.

Some embodiments may include more than one wheel and multiple flexible joints or other movable connections in the ground follower assembly to improve the travel of the ground tracking device over uneven terrain and/or provide additional sensor data or information. One such embodiment is illustrated in FIG. 11, in which a dual-wheel ground tracking system 194 includes a locator, which may be same locator 104 as shown in FIG. 1, coupled to a dual-wheel ground tracking device 196, which may be moved across uneven terrain by an operator 102 but may be able to sense additional ground or surface characteristics. Examples of movements that may be sensed with a multi-wheel (or equivalent) ground tracking device embodiment, such as embodiment 196, are shown in FIG. 1D, where the locator 104 may be moved in a side-to-side rotation relative to the dual wheels, such as left wheel 212 and right wheel 214.

For example, in the orientation shown in illustration 100D-1, the locator 104 is tilted an angle $\beta 1$ with respect to the ground surface 300 (in this example, at an angle slightly greater than 90 degrees from the ground horizontal). A side-to-side sensor assembly in the ground tracking device 196, such as described subsequently, may be configured to measure the side-to-side movement and generate and provide corresponding signals that may be processed in the ground tracking device and/or provided to the locator 104. Additional sensing elements, such as gyroscopic sensors, accelerometers, additional magnetic sensors, tilt sensors, or other sensing elements may be further used to generate additional measurement information that may be combined with the side-to-side measurement data. For example, an accelerometer or gyroscopic sensor disposed in the locator 104 may generate signals corresponding to the relative position or movement of the locator with respect to vertical. This information may be combined with the side-to-side sensor information to generate further data and information regarding a locate or tracking procedure.

For example, in the orientation shown in illustration 100D-2, the locator is tilted to the right side of vertical (as shown in the figure) at an angle $\beta 2$. In this position, the locator 104 is offset to the right from vertical while the ground follower assembly (including wheels 212 and 214) is in a vertical position. Alternately, in the orientation shown in illustration 100D-3, the locator is in a vertical position, while the ground follower assembly is offset from the vertical (e.g., at an angle $\beta 3$), corresponding to a ground slope. By sensing the side-to-side rotation of the ground follower assembly as well as the vertical offset of the locator 104, a determination may be made as to the slope or offset of the ground from horizontal (e.g., $90-\beta 3$ degrees in this case). The angles $\beta 2$ and $\beta 3$ may be the same; however, by sensing both side-to-side rotation of the ground tracking device and vertical orientation of the locator, additional information about the locate or tracking procedure (e.g., whether the ground is level and the locator is tilted to the side as shown in 100D-2, or whether the locator is vertical and the ground is sloped as shown in 100D-3, or combinations of both (not shown)) may be determined.

In some embodiments, vertical orientation sensing, such as described above with respect to the locator, may be incorporated in the ground tracking device. For example, in some embodiments a ground tracking device may include a gyroscope, accelerometer, tilt sensor, or other sensing element to further sense vertical orientation. In other embodiments, vertical orientation sensing may be incorporated into the locator or other measurement device. In addition, in some embodiments, vertical orientation sensing may be incorporated in both the ground tracking device and the locator or other measurement device.

Figure 12:
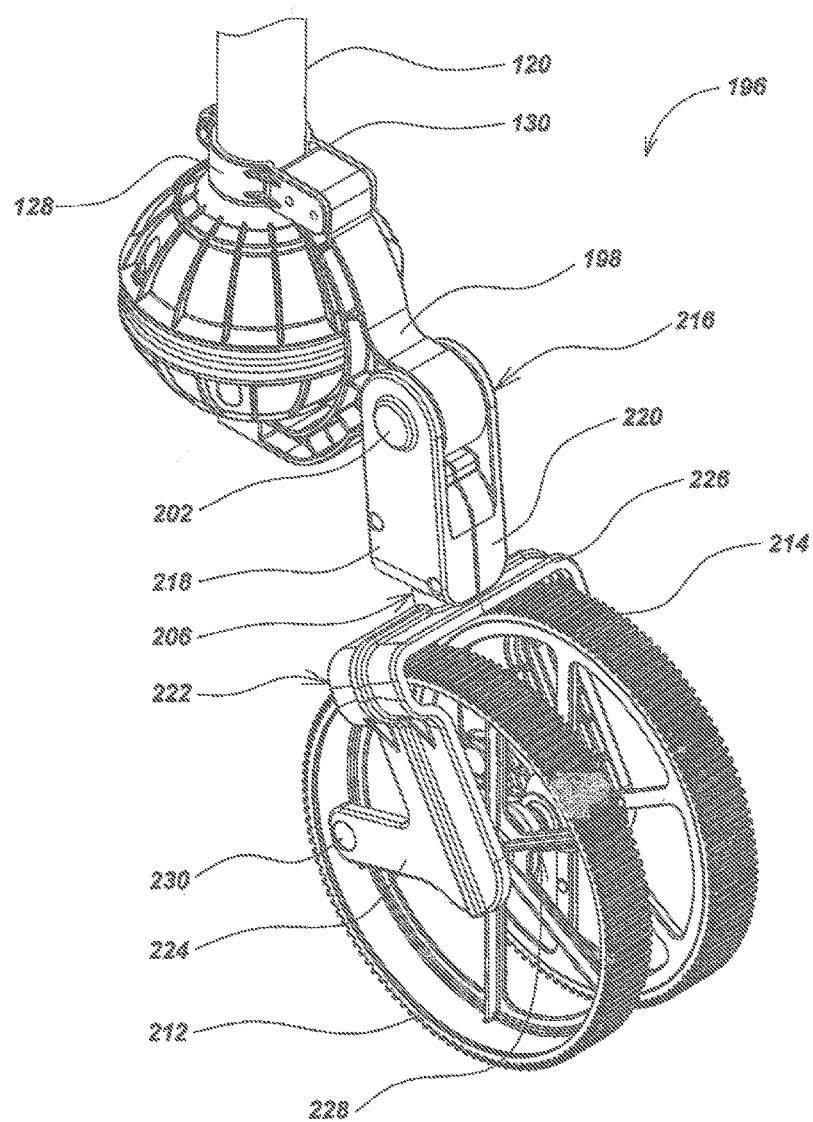
FIG. 12 is an enlarged rear isometric view of the embodiment of FIG. 11.

Returning to the ground tracking device embodiment 196 shown in FIG. 12, a yoke 198 may be used to facilitate a rotation 200 (as shown in FIG. 11 and corresponding to the movements shown in FIG. 1B) around the vertical axis of the locator 104 (e.g., around locator mast 120 and lower antenna enclosure 126), with an associated yoke sensor configured to sense the rotation and generate an output signal corresponding to the rotation. A yoke joint 202 may be formed at the midsection of the yoke 198 to enable a rotation 204 around the horizontal axis of the yoke joint 202 to facilitate movements such as shown in FIG. 1C. A wrist joint assembly, such as wrist joint assembly 206, may be used to enable a limited-travel rotation 208 clockwise or counter-clockwise (as viewed from the front end of the dual-wheel ground tracking device 196) around a horizontal axis through the center of the wrist joint assembly 206. This may be used to sense side-to-side motion as described previously herein.

Figure 15:
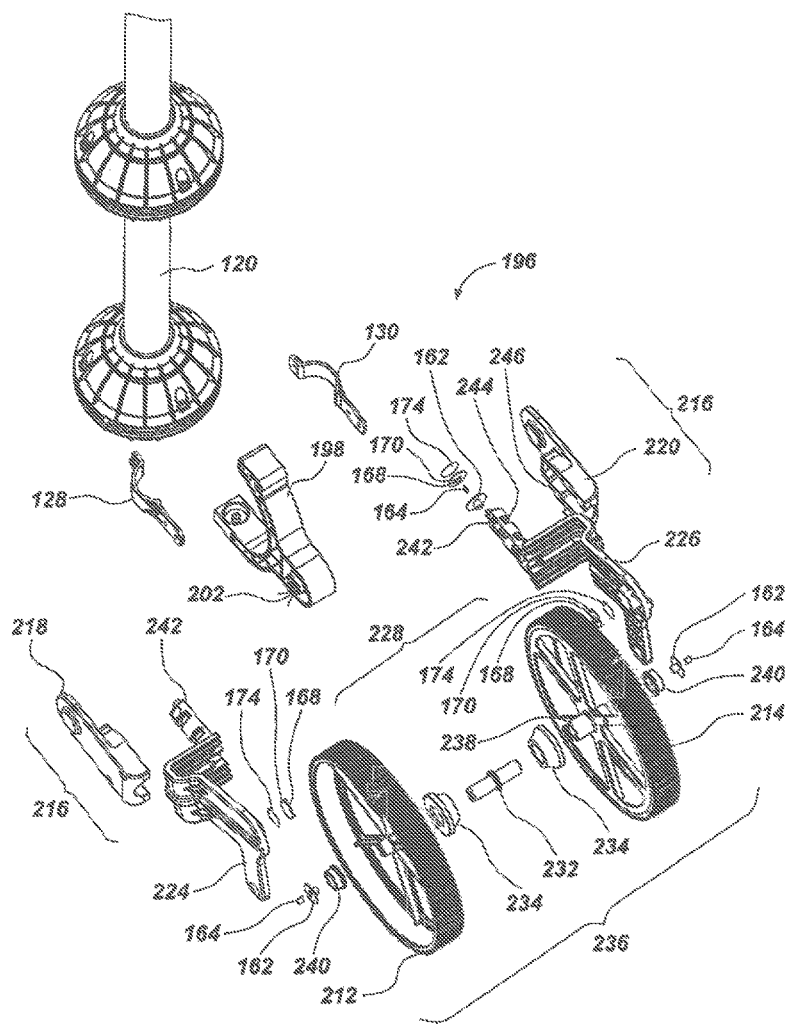
FIG. 15 is an exploded view of the embodiment of FIG. 11.

Details of example wrist joint assembly embodiment 206 are further shown in FIG. 15. As noted previously, dual or multi-wheel ground follower assembly embodiments such as shown on ground tracking device 196 are also capable of separate wheel rotations 210 around the wheel hub of a left wheel 212 and a right wheel 214. These separate rotational movements may also be sensed to provide signals for generating further data or information such as rotational direction, speed, etc.

Figure 16:
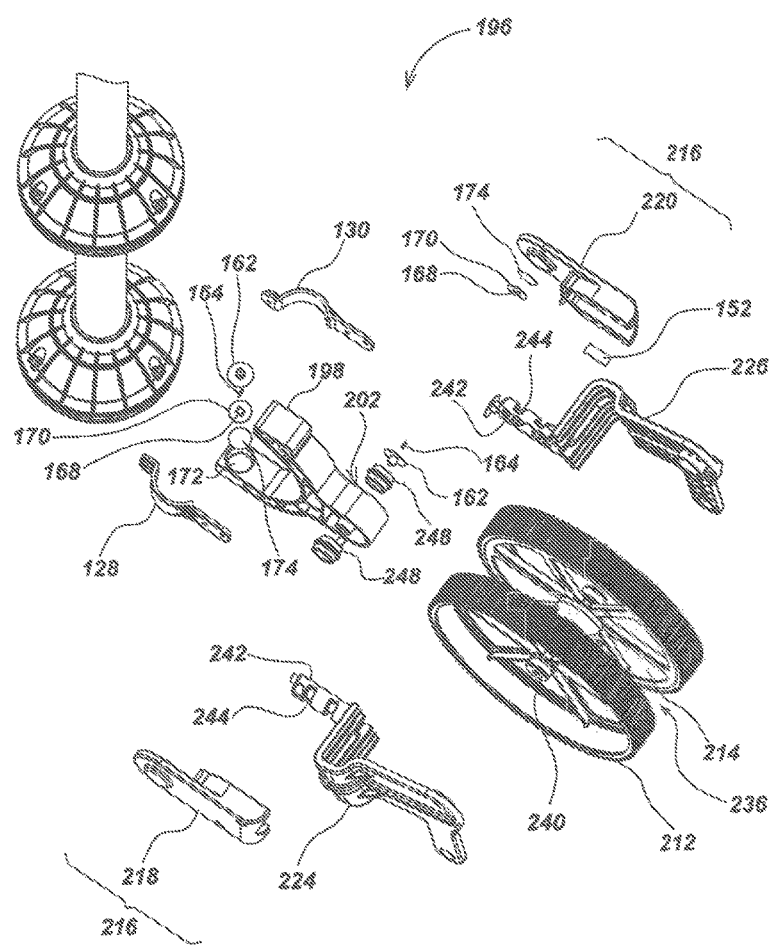
FIG. 16 is another exploded view of the embodiment of FIG. 11 illustrating further details of its sensors and magnets.

The embodiment of FIG. 11 includes five instances of the magnet, shield, sensor, PCB and foil arrangement 192 (as shown in FIGS. 9 and 10), as the left wheel 212, the right wheel 214, the yoke joint 202 and the wrist joint assembly 206, as well as rotation around the vertical axis of the locator mast 120 made possible by the yoke 198, may all move independently of each other as the dual-wheel ground tracking system 194 is moved by the operator 102 across varying terrain. An example configuration of the various magnets 164, magnetic shields 162, and magnetic sensors 168 is shown in FIGS. 15 and 16 in further detail.

An example configuration of the magnetic sensor 168, the magnetic shield 162 and the permanent magnet 164 used to measure rotation around the axis of the locator mast 120 in this embodiment is shown in FIG. 8.

Returning to FIG. 12, additional details of an embodiment of a dual-wheel ground tracking device 196 is shown. In this embodiment, the ground tracking device is moveably attached to the locator mast 120 by brackets, including a left yoke bracket 128 and a right yoke bracket 130, which may be secured by screws, such as screws 154 shown in FIG. 5, or using other attachment mechanisms. In some configurations, the attachment mechanism may be configured to quickly attach or detach, such as by using latches, straps, or other removable attachment mechanisms.

In the illustrated embodiment, the yoke 198 is configured to rotate around the locator mast 120. The yoke 198 may include a yoke joint 202 at its midsection coupled to a yoke arm structure assembly 216, which in turn may comprise a left yoke arm 218 and a right yoke arm 220 as shown. In some embodiments, other yoke configurations, such as single arms or arms having different shapes and/or sizes may be used. The yoke arm structure assembly 216 may be used as a connecting member between the yoke 198 and a wheel arm structure assembly 222, which may be part of a ground follower assembly. The ground follower assembly may further include wheel arm structure assembly 222, wrist assembly 206, and left and right wheel arms 224 and 226. The lower end of the yoke arm structure assembly 216 may be coupled to the wheel arm structure assembly 222, using wrist joint assembly 206, which may comprise two mating halves, a left wheel arm 224, and a right wheel arm 226. Left wheel 212 and right wheel 214 may serve as ground follower elements in this embodiment. The yoke arm structure assembly 216 may be formed by the two mating halves (the left yoke arm 218 and the right yoke arm 220) joined around a shaft-end formed in the wheel arm structure assembly 222. Additional details of the wrist joint assembly embodiment 206 are further detailed in FIG. 15, FIG. 16, and FIG. 17. Left wheel 212 and right wheel 214 may serve as ground follower elements as shown.

In the embodiment of FIG. 12, the shapes and angles of the yoke arm structure assembly 216 and the wheel arm structure assembly 222 may vary in design. The central area of a wheel axle assembly 228 or the rear or lower area of the wheel arm structure assembly 222 may be augmented with one or more instances of a counterweight, such as brass counterweight 230 to improve traction and self-righting movement when traversing terrain. In FIG. 12, the yoke arm structure assembly 216 and the wheel arm structure assembly 222 may be configured as shown to form an angle to provide better stability for the left wheel 212 and the right wheel 214. As further shown in FIG. 12, each half of the wheel arm structure assembly 222 may be formed with an extended arm below the centerline of the wheel axle assembly 228; at the lower end of which arm a counterweight 230 of brass or similar material may be seated to further improve self-righting stability over the ground by adding rear-end weight.

The swivel action of the wrist joint assembly 206 allows the dual-wheel ground tracking device 196 to better maintain ground contact for each wheel on an uneven surface, and may also be used to enable the dual-wheel ground tracking device 196 to provide additional information about the slope of ground (in a cross-axis direction) being traversed, as well as providing additional motion information such as described previously. This motion may be sensed by a sensor associated with the wrist joint assembly which may be configured to sense side-to-side or other movements. Separate instances of magnets and magnetic sensors, and/or other sensing elements, may be used for the left wheel 212 and the right wheel 214.

Figure 13:
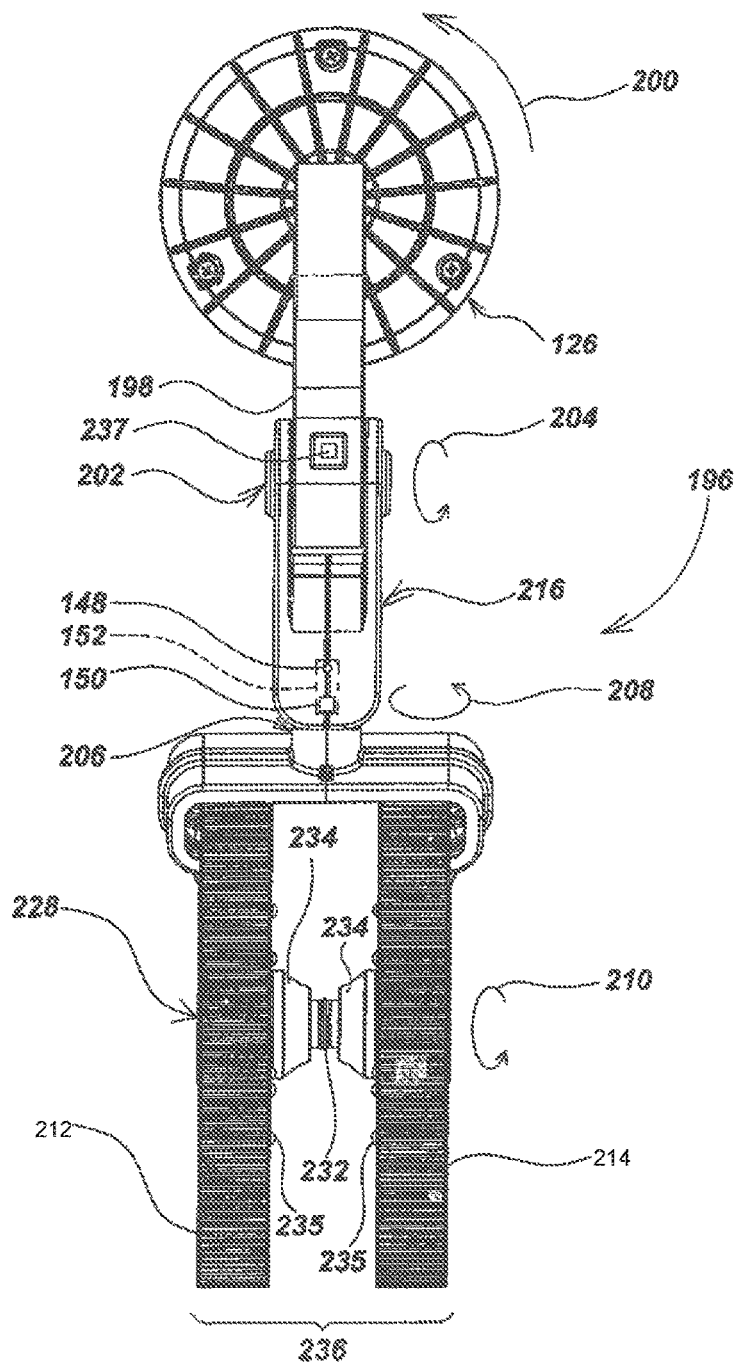
FIG. 13 is a bottom plan view of the embodiment of FIG. 11.

Turning to FIG. 13, the dual wheel ground tracking device embodiment 196 is shown from below (e.g., as would be seen looking up from the ground). As shown in this view, rotations which may be sensed include rotation 200 around the central axis of the lower antenna enclosure 126 (corresponding to the movements shown in FIG. 1B); rotation 204 around the yoke joint 202 (corresponding to the movements shown in FIG. 1C); rotation 208 around the axis of the wrist joint assembly 206; as well as individual rotations 210 for each of the left wheel 212 and the right wheel 214, around the axis of the wheel axle assembly 228. A central axle bushing 232 of Delrin or similar material may be disposed at the center of the wheel axle assembly 228 between the left wheel 212 and the right wheel 214. On either side of the axle bushing 232 a formed stowage grip 234 may be seated. The stowage grips 234 provide a mechanism for latching a wheel assembly 236 against a locator mast 120 or other structure of a measurement device, by a friction grip when the dual-wheel ground tracking device 196 is not in use, for ease of stowage and portability.

A gap may be included between the left wheel 212 and the right wheel 214 to function as a slot into which the locator mast 120 fits (with the yoke arm structure assembly 216 rotating around the yoke joint 202) for storage and carrying, creating a more compact stowed assembly. Additionally, a series of bumps 235 formed in, or adhesively attached to, the inside of each radial spoke of the left wheel 212 and the right wheel 214 near the mid-point of the spoke may be used to provide a friction grip on either side of the locator mast 120 when the dual-wheel ground tracking device 196 is folded against the locator 104 in a stowed configuration. The bumps 235 may be located on the inner rim of the left wheel 212 and the right wheel 214, on the spokes, or both. At the bottom of the yoke arm structure assembly 216, a ground sensing assembly, such as white LED 148 and the optical sensor 150 may be mounted, such as on the inset optical sensor PCB 152.

In some embodiments, an optical mouse sensor 237 may optionally be mounted in a location near the ground in ordinary operation, such as on the lower surface of the yoke arm structure 216. The optical mouse sensor 237 may include an integrated LED and a simple imaging or camera chip with associated processing circuitry. In operation, the optical mouse sensor 237 may be configured to capture images between approximately 1500 and 7080 times per second, with typical resolution of approximately 800 to 1600 counts per inch. One example of such a sensor is the Agilent ADNS 3080. The optical mouse sensor 237 may be equipped with auxiliary optics and a side-lit narrow-beam LED in the IR range of approximately 700-1000 nanometers. Image data from the optical mouse sensor 237 may be processed on an associated circuit board to provide fine-movement information which may then be integrated into the position and orientation calculus for the dual-wheel ground tracking device 196.

Figure 14:
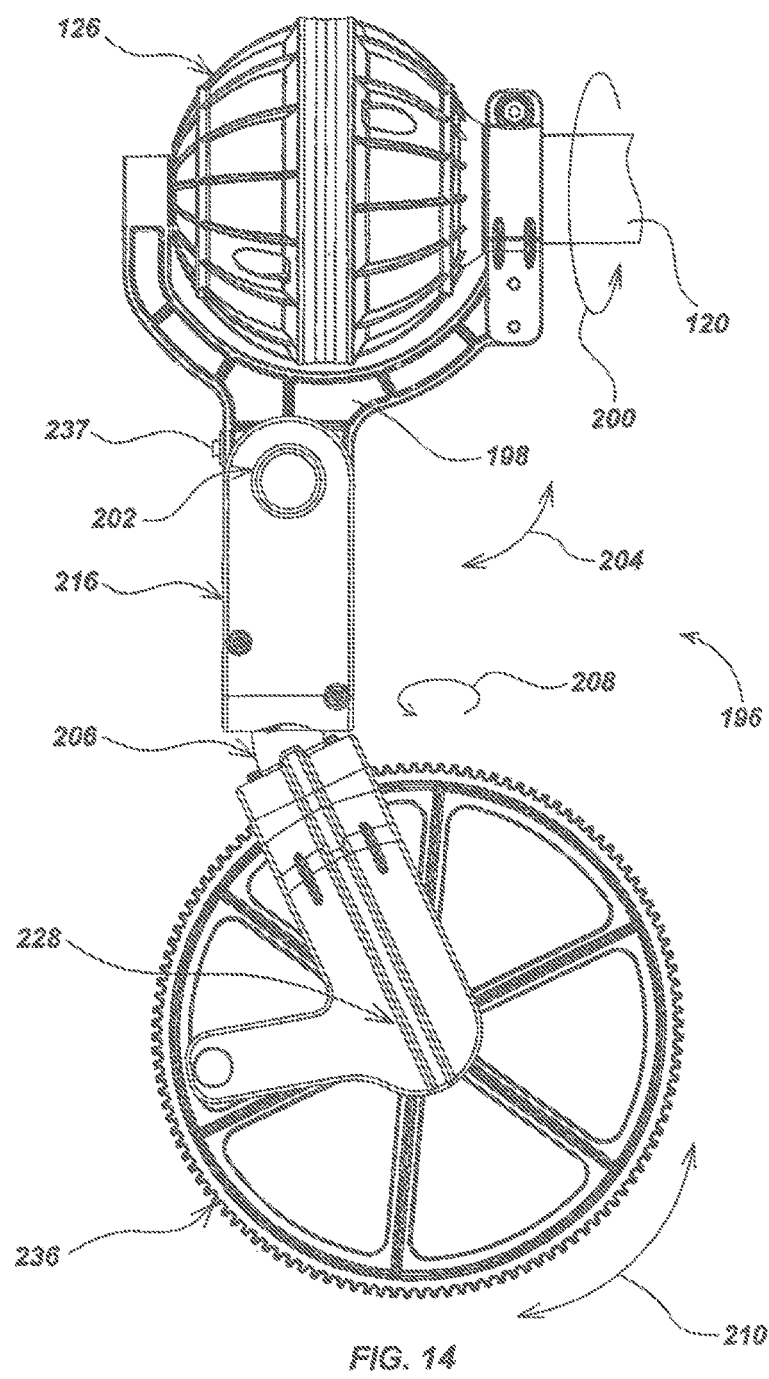
FIG. 14 is a side elevation view of the embodiment of FIG. 11.

Turning to FIG. 14, example rotational movements of the dual-wheel ground tracking device embodiment 196 are shown from the left side. For example, rotation 200 around the axis of the locator mast 120 and the lower antenna enclosure 126 may be implemented using yoke 198. The rotation 204 of the yoke arm structure assembly 216 around the axis of the yoke joint 202 may be implemented by the yoke joint 202. The rotation 208 around the approximately horizontal axis of the wrist joint assembly 206 may be enabled by the wrist joint assembly 206. Each wheel rotation 210 relative to the wheel assembly 236 may be enabled by the wheel axle assembly 228.

Turning to FIG. 15 and FIG. 16, details of an exemplary embodiment of a two wheel assembly configuration 236 of a ground follower assembly is shown. Wheel assembly 236 may include the left wheel 212 and the right wheel 214 which may each include a wheel hub section, such as section 238, on which may be seated an axle bushing 232, tubular in cross-section and which may be composed of Delrin or like material. The wheel axle assembly 228 may be formed by the left wheel hub section 238 on the left wheel 212 (obscured in this view) and the counterpart right wheel hub section 238 on the right wheel 214 in combination with the axle bushing 232.

The resultant wheel axle assembly 228 as shown supports two of the wheel bushings 240 and two of the stowage grips 234. The wheel bushing 240 associated with the left wheel 212 may contain the magnetic shield 162 for the left wheel 212. The wheel bushing 240 associated with the right wheel 214 may contains the magnetic shield 162 for the right wheel 214. A permanent magnet 164 associated with the left wheel 212 may be seated within the magnetic shield 162 located in the hub of the left wheel 212. A permanent magnet 164 associated with the right wheel 214 may be seated within the magnetic shield 162 located in the hub of the right wheel 214. One of the magnetic sensors 168 mounted on one of the sensor PCBs 170 with the metallic foil backing 174 may be mounted in each of the left wheel arm 224 and the right wheel arm 226. The use of dual wheels, with separate sensor mechanisms, may be used to provide a more accurate measure of pivoting or turning (relative to a single wheel embodiment), and/or of tracking motion and orientation over uneven terrain where the wheels may not be rotating in the same degree. Dual wheel configurations may also be used to provide improved resolution and accuracy, particularly over rough terrain for direct linear measurement, such as when used with a measuring device for applications other than locating.

A wrist joint assembly 206 may be supported when the mating left yoke arm 218 and the right yoke arm 220 of the yoke arm structure assembly 216 are seated around a shaft (consisting of two mating wrist shaft sections 242) formed by mating the left wheel arm 224 and the right wheel arm 226. The wrist shaft sections 242 so mated may be formed with a series of grooves such as 244. In assembly, a series of solid ridges such as 246 formed in the inner face of the left yoke arm 218 and right yoke arm 220 may be configured to lock into grooves such as grooves 244, thereby providing a secure entrainment between the yoke 198 and the yoke arm structure assembly 216 and the wheel arm structure assembly 222 (see FIG. 12) and the wheel assembly 236.

A wrist swivel element of the wrist joint assembly 206 may be used to allow dual wheel configurations to keep both wheels on the ground and provide additional information about the slope of the ground in a cross axis direction. The wrist swivel element of the wrist joint assembly 206 (see FIG. 14) may be limited in its travel by the grooves 244 and the ridges 246. A magnetic shield 162 containing a permanent magnet 164 for the wrist joint assembly 206 may be seated in the end of the assembled shaft formed by the left and right wrist shaft sections 242. The magnetic sensor 168 for wrist joint assembly 206 may be mounted on sensor PCB 170 with the metallic foil backing 174 and may be seated inside the forward ends of the right yoke arm 220 and the left yoke arm 218, aligned with the end of the assembled shaft (shown moved away therefrom for clarity in FIG. 15).

Referring to FIG. 16, the yoke joint 202 may incorporate two instances of a yoke bushing 248. The right-hand yoke bushing 248 may contain a magnetic shield 162 and a permanent magnet 164 associated with the yoke joint 202. The corresponding magnetic sensor 168 (on the separate sensor PCB 170 with a metallic foil backing 174 may be mounted in the forward end of the right yoke arm 220, aligned with the central axis of the yoke joint 202.

Further in FIG. 16, a magnetic shield 162 and a permanent magnet 164 associated with the adaptor port 160 (FIG. 8) are shown moved outside the adaptor port 160 (FIG. 8) for illustrative purposes. The corresponding magnetic sensor 168 seated on the sensor PCB 170 with the metallic foil backing 174 may be seated in the receptacle 172 in the center of the lower arm of the yoke 198.

A white LED 148 and an optical sensor 150 may be mounted on the underside of the inset optical sensor PCB 152 (see FIG. 13).

Figure 17:
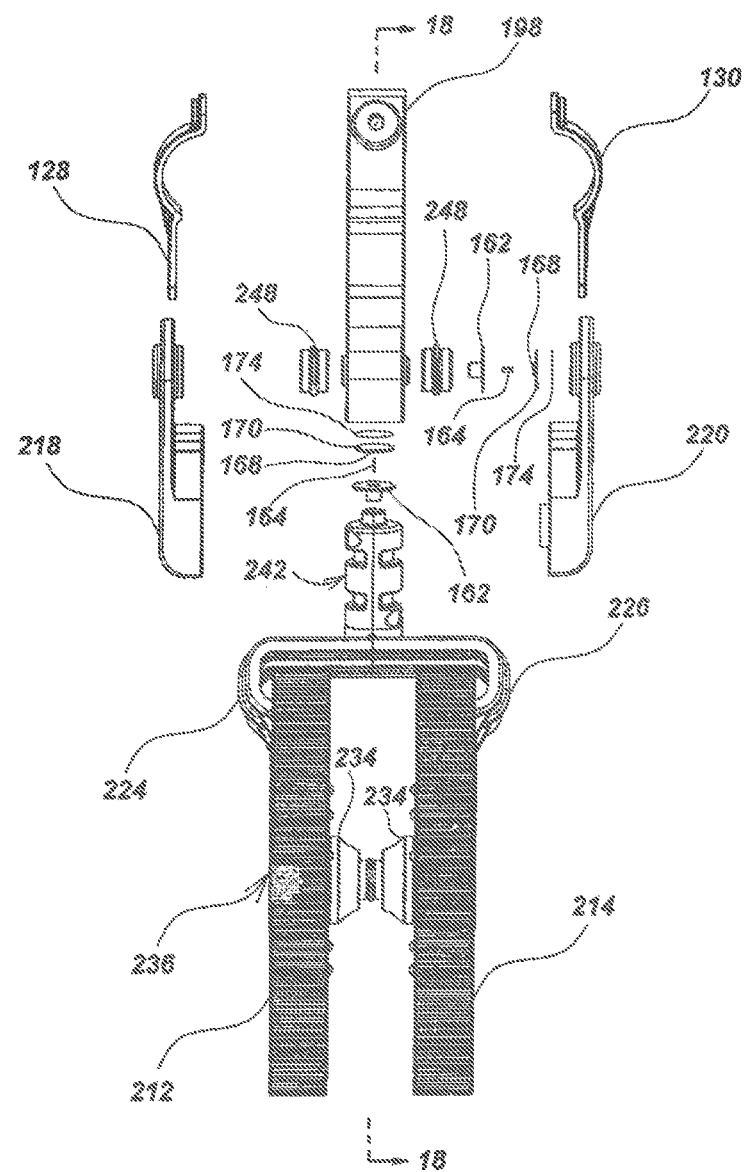
FIG. 17 is an exploded top plan view of the embodiment of FIG. 11.

Turning to FIG. 17, a shaft formed by the wrist shaft sections 242 may contain a magnetic shield 162 of the wrist joint, with a permanent magnet 164 in its forward end. A corresponding magnetic sensor 168 on the sensor PCB 170 with the metallic foil backing 174 may be seated within the joined right yoke arm 220 and left yoke arm 218, aligned with the central axis of the wrist shaft sections 242 when assembled, to provide measurement of the angle of the wrist joint assembly 206. A magnetic shield 162 and a permanent magnet 164 for the yoke joint 202 may be seated in the right hand yoke bushing 248, while a corresponding magnetic sensor 168 and a corresponding sensor PCB 170 with a metallic foil backing 174 may be attached to the right yoke arm 220 to provide measurement of the angle of the yoke joint 202.

An arm PCB, which may be similar to that shown in FIG. 6, may optionally be mounted in the right wheel arm 226 or the right yoke arm 220 and used to mount sensors such as the magnetic sensor 168 for the yoke joint 202, and the sensor (not shown in this view) associated with the right wheel 214, as well as other optional sensors, such as those shown in FIG. 6.

Figure 18:
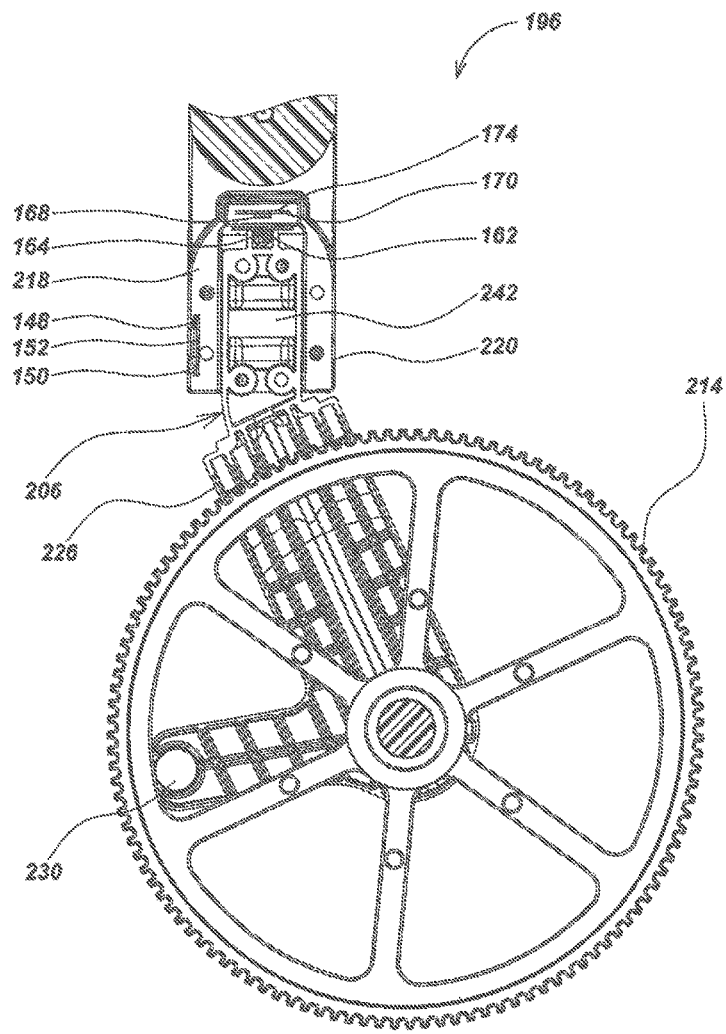
FIG. 18 is a sectional view of the embodiment of FIG. 11 taken along line 18-18 of FIG. 17.

In FIG. 18, a magnetic sensor 168 and a sensor PCB 170 associated with the wrist joint, with a metallic foil backing 174, are shown. They may be located in proximity to and centrally aligned with the wrist joint's magnetic shield 162 and its retained permanent magnet 164. A wrist joint assembly 206 enclosed by the left yoke arm 218 and the right yoke arm 220, and including the wrist shaft section 242, is illustrated. An angled extension of the right wheel arm 226 may hold a brass counterweight 230 in a formed receptacle.

As in the previously described embodiment as illustrated in FIG. 5 and FIG. 6, an arm PCB (not shown) may be seated within a formed wheel arm structure assembly 222, or yoke arm structure assembly 216 (see FIG. 15), and may be electrically connected to sensor PCBs 170 for the magnetic sensors 168 associated with the left wheel 212 and the right wheel 214, the yoke joint 202 and the wrist joint assembly 206. As shown in FIG. 6, such a PCB may support optional additional sensors such as a three-axis gyro sensor, a GPS module, a three-axis compass IC, and a three-axis accelerometer, and/or may include a microprocessor or other processing element or circuit.

Such a suite of sensors may be used to provide finer resolution in data when the device traverses different surface features such as expansion joints, curbs, transitions from concrete to gravel, or other surface transitions. This functionality may be used to support integration of locate data with maps or images, or correlating images to ground features. As in earlier embodiments, wired or slip-ring or wireless connection elements (not shown) may be used to communicate sensor data to the locator 104 or to other computing processors or devices.

Some embodiments, such as those illustrated in FIG. 1 and FIG. 11, may use a battery in associated locator 104 or other measurement device for power. In an alternate embodiment, separate battery receptacles suitable for holding, for example, a pair of 18650 Li-Ion batteries or other batteries may be formed into the arm structures near the wheels of the device, which may also improve traction by increasing the weight applied to the wheels.

Figure 20:
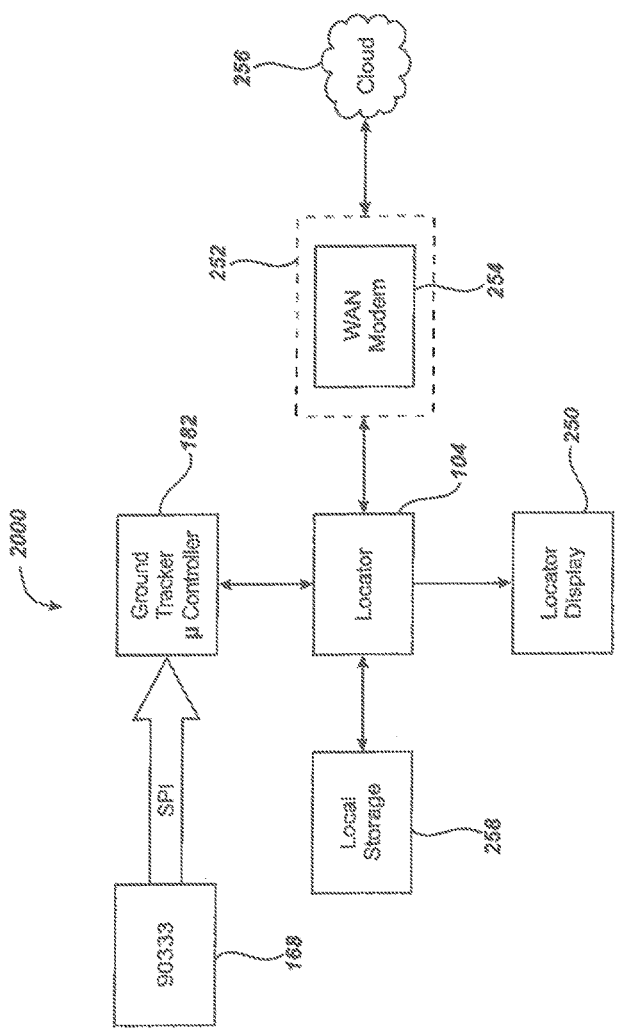
FIG. 20 is a block diagram illustrating details of an embodiment of a process for integrating data from a typical magnetic sensor such as is shown in the embodiments of FIGS. 1 and 11.

The locator 104 in FIG. 1 and in FIG. 11 may house a CPU or other processing element or circuit for collecting, processing and/or storing detector and locate information, and may be provided with a thumb drive, flash memory or other mechanism for storing information for later upload to a remote system. In an alternate embodiment, a Bluetooth IC or other wireless device may be added to the main PCB of the device to transmit data to a remote computing station for integration with maps and images. Alternatively, some integration may be done within the locator itself and incorporated into the locator's display device, such as by use of a graphic overlay to assist in the locate process. The locator 104 may be associated by Bluetooth wireless connectivity or other wireless mechanisms with a smart device, such as a phone capable of interchanging data with cloud-based servers used for post processing and integrating orientation and position data. (An example of such a configuration is illustrated in FIG. 20 and in FIG. 21).

In use, the data derived from the angle of the yoke joint 202 as well as other positional sensors may be used to compute the height above ground of the lower antenna enclosure 126 of the locator 104 (or other reference positions on different measuring devices) to enhance the accuracy of depth calculations for locator-detected buried conductors. This is illustrated in the example movements shown in FIG. 1C, where various elevations E1, E2, and E3 of the lower antenna enclosure are shown. Calculation of the height may be determined by measurement of the angle between the ground follower assembly and a locator reference element, such as angles $\Theta 1$, $\Theta 2$ or $\Theta 3$ along with the knowledge of the swing-arm length or fixed distance between the wheel 116 and locator 104.

Captured X, Y and Z data provided by the various magnetic sensors 168 also enable the system to correlate locate information against photographs, maps and as-builts and correct them. Such processing may occur in on-board microprocessors or at remote computing stations to which data is transmitted through wireless devices, a wired network connection, or some removable device such as a thumb drive, for example.

Turning to FIG. 19, a block diagram 1900 illustrating an example interconnection between an individual permanent magnet 164 and an example of the magnetic sensor 168, in this instance the Melexis MLX90333 tri-axis sensor chip being used in serial output mode. The Melexis MLX90333 uses four conventional Hall plates located under the perimeter of an integrated magneto-concentrator in a CMOS integrated circuit to measure magnetic field components. The magneto-concentrator is deposited on the CMOS integrated circuit during fabrication.

The external magnetic field of the permanent magnet 164 causes a magnetic flux through the front end of magnetic sensor 168. In particular, the external Z component of the field causes radial flux component in the magneto-concentrator which is in turn sensed to a have a horizontal component in each of the four Hall plates. External magnetic fields parallel to the plane of the magneto-concentrator and the CMOS integrated circuit cause magnetic fluxes in the Hall plates that have an opposite sign in at least one Hall plate when compared to the fluxes produced by the vertical component. The outputs of the four separate Hall plates may be added and subtracted to provide three signals proportional to the three components (Hx, Hy, and Hz) of the external magnetic field.

The output mode parameter "XYZ" may be programmable to enable output data frames containing X, Y and Z values when XYZ is set to 1, or containing Alpha and Beta angle values when XYZ is set to 0. Sampling rates depend on programmable slow/fast mode selection setting the unit's master clock to 7 or 20 MHz respectively with samples typically occurring at 200 microseconds in fast mode and at 600 microseconds in slow mode.

Turning to FIG. 20, a block diagram of an embodiment 2000 of a process flow for integrating motion sensing signals is illustrated. Process flow diagram 2000 illustrates example functions that may be used to integrate data from motion and/or rotation sensors, such as magnetic sensors 168 as described previously herein. For example, magnetic sensors 168 may be connected via an SPI bus or other interface circuit to a processor element, such as microcontroller 182, of a ground tracking device, such as dual-wheel ground tracking device 196, where the sensor signal may be further processed and/or forwarded or relayed by wired or wireless connections to a measurement device, such as locator 104. In a typical implementation, the measurement device, such as locator 104, includes a separate processing circuit (not shown), which may include a microcontroller, microprocessor, ASIC, DSP, or other programmable device, along with memory and other associated circuit elements. The measurement device processing circuit may be configured to compute location, motion, and/or orientation information and updates, and may store this information in memory and/or may display a representation of the information on a display element, such as locator display 250. The locator 104 may optionally be linked to a smart device 252 such as a smart phone, PDA, tablet device, notebook computer, or other smart device incorporating a WAN modem 254, cellular link, or other wireless communication links in which captured sensor data may be packetized and transmitted to the cloud 256 of internetworked servers for further processing, storing, remote access and/or remote display, and/or relaying. The locator or other measurement device may include a local storage device interface, such as a USB or other port. For example, a local storage device 258 connected to locator 104, such as a thumb drive or other storage device such as a USB-connected flash memory, for example, may be used.

Figure 21:
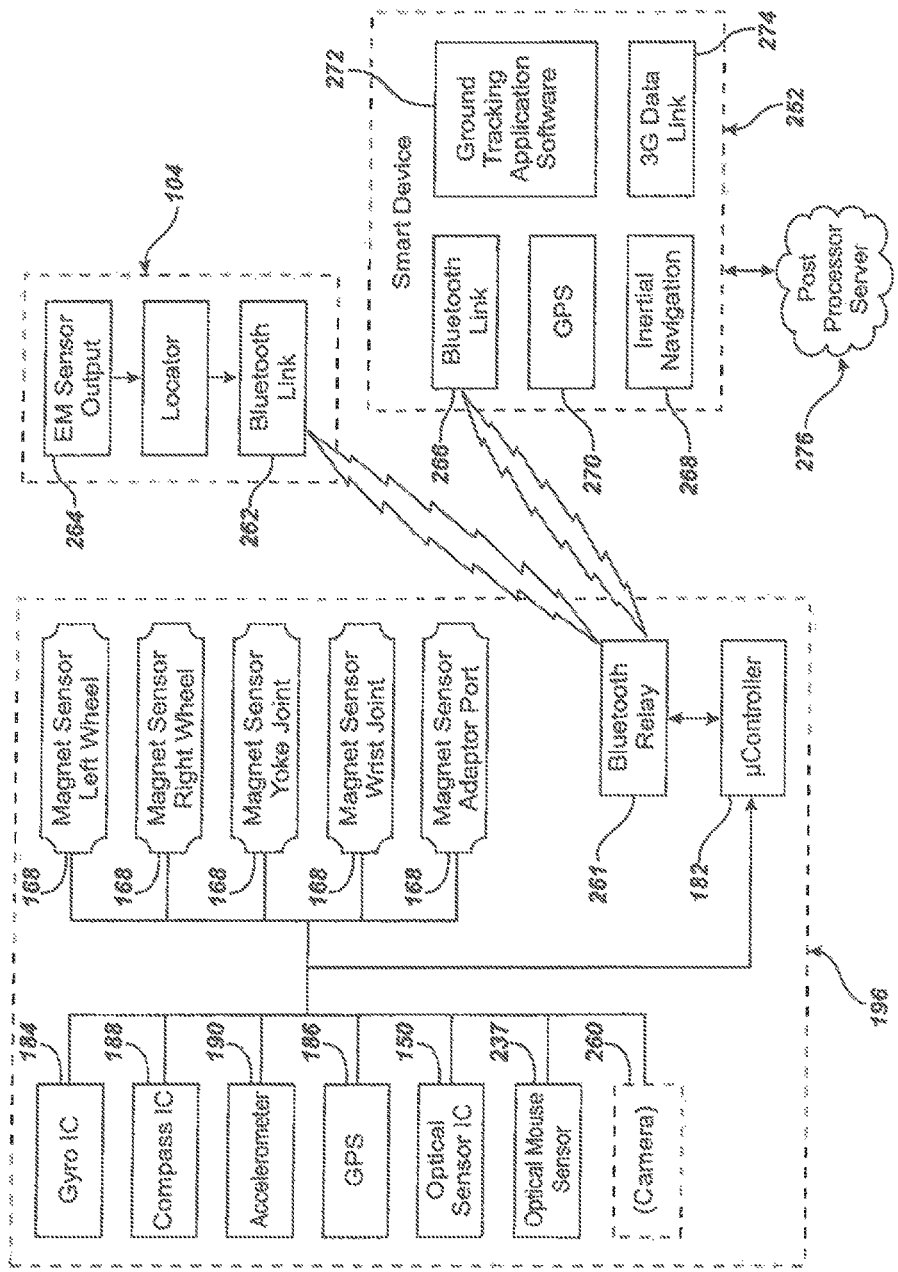
FIG. 21 is a block diagram illustrating details of one embodiment of the present disclosure for use in communicating data to one or more remote servers in accordance with aspects of the present disclosure.

Referring to FIG. 21, the illustrated dual-wheel ground tracking device embodiment 196 may include a gyroscopic sensor, such as three-axis gyroscopic sensor IC 184, a compass element, such as three-axis compass IC 188, one or more accelerometers, such as three-axis accelerometer IC 190, a satellite or terrestrial location device, such as a GPS module 186, an optical sensor element, such as optical sensor 150, and/or an optical mouse sensor, such as optical mouse sensor 237. An imaging or camera element, such as a two- or three-dimensional camera 260 may optionally be mounted on the ground follower assembly, such as at a forward edge of a yoke element, such as the C-shaped yoke 112, to provide additional imagery used in detecting ground features and/or surfaces.

Input from sensors such as the magnetic sensors 168 may also be processed within a ground tracking device, such as embodiments 110 and/or 196 as described previously herein, using an onboard ground tracking device processing element, such as microcontroller 182 or other processor or programmable devices or signal processing circuits. A ground tracking device wireless connection element, such as an on-board Bluetooth relay 261, may be used to implement a data link to a separate receiver element, such as Bluetooth link 262, which may be located on the measurement device, such as locator 104 in the illustrated configurations.

The multi-dimensional antenna coils of locator 104 may be used to derive EM sensor data 264. Other measurement devices may provide alternate sensor data or information. The sensor data may then be relayed from the locator 104 or other measurement device using Bluetooth link 262 and Bluetooth relay 261 to an optional associated smart device 252, such as a smart phone or similar device. The smart device 252 in this example may be equipped with a Bluetooth link 266, as well as typically including an inertial navigation subsystem 268 and a GPS module 270 of its own. The smart device 252 may run a specific Ground Tracking software application 272 designed to integrate multiple data streams from the ground tracking device and its own sensors, and to transmit data packets using a wireless data link, such as 3G data link 274. Data transfer from the smart device 252 by the 3G data link 274 enables data to be sent to and received from one or more post-processing servers 276 located in the internetworked cloud. Additional sensors may be optionally included depending on application, including an acoustic range finder, a ground-penetrating radar used in conjunction with an optical or laser range-finder, a barometric pressure sensor, a humidity sensor, and an RFID receiver. Sensor data from these additional sensors may be integrated with the various types of sensor data described previously herein to generate additional position, motion, location, and/or related data or information.

Alternative configurations will be apparent to one skilled in the art, such as utilizing the smart device's GPS module 270 and omitting the GPS module 186 in the dual-wheel ground tracking device 196, or embedding the smart device's 252 components into the dual-wheel ground tracking device 196 or the locator 104, for example. Accordingly, the configurations of elements shown in the appended figures are provided for purposes of explanation, not limitation.

Figure 22:
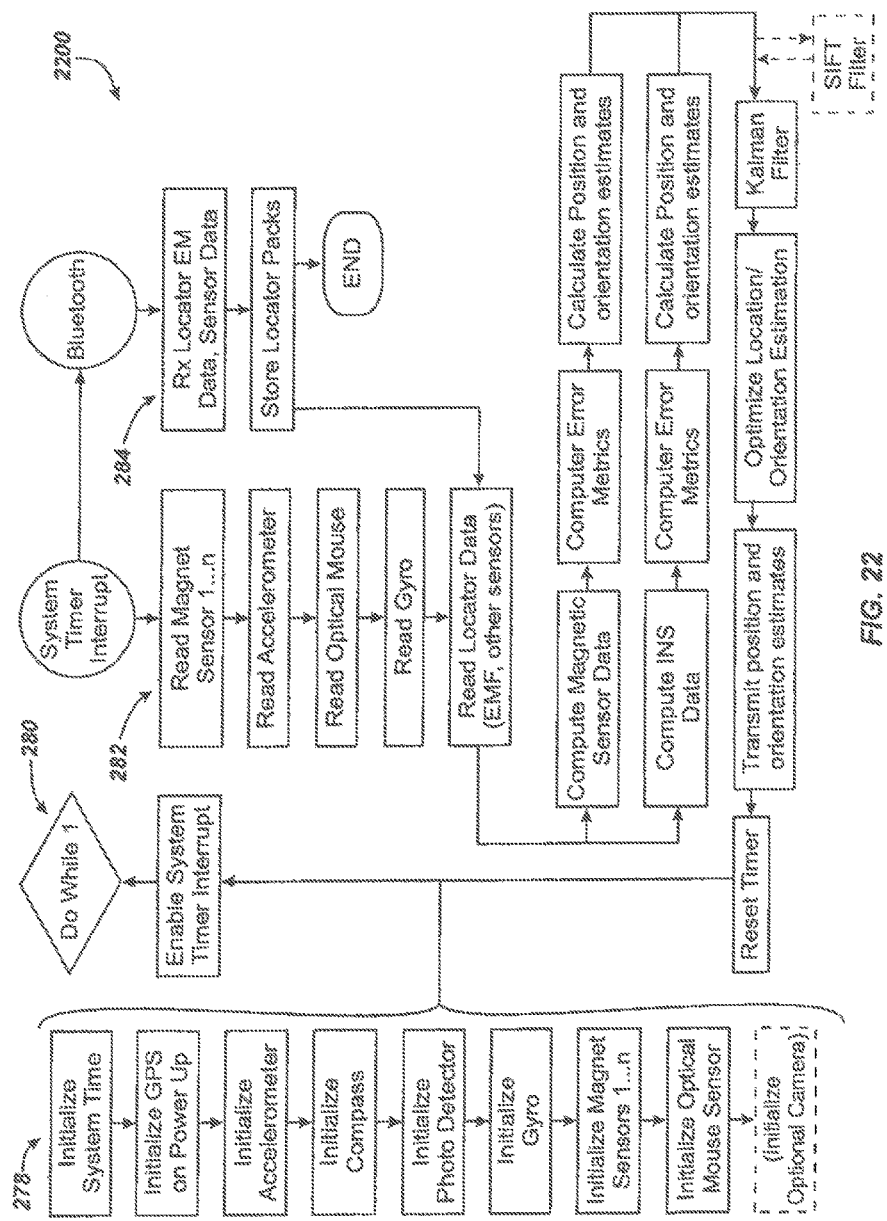
FIG. 22 is a flow chart illustrating details of an embodiment of a process for integrating sensor data in accordance with aspects of the present disclosure.

Turning to FIG. 22 a flow chart illustrates an embodiment of a process 2200 for sensor data integration. The process may include an initialization process 278, a system interrupt process 280, a read-and-calculate process 282, and a Bluetooth data acquisition process 284. In the initialization process 278 the system time and all system sensors, optionally including an on-board camera for ground surface analysis, may be initialized. The system interrupt process 280 may begin with the interrupt being enabled and listening for an interrupt signal, while its value is "1." When an interrupt signal is received, depending on the particular sensors used, the magnetic sensor data for magnetic sensors 1 to n may be read, the accelerometer values may be read, the values from the optical mouse sensor may be read, the gyroscopic values may be read, and the results of the Bluetooth data acquisition process 284, which acquires data provided from the locator, may be read. The number n of magnetic sensors may vary with design.

One set of estimates of location and orientation may be derived from the data recorded from the magnetic sensors 168, and a second set of calculations of location and orientation may be done based on data derived from the navigational components (e.g., the three-axis accelerometer 190, the three-axis gyroscopic sensor IC 184, the three-axis compass IC 188, and the optical mouse sensor 229 as shown in FIG. 21). A filtering algorithm for a time series of imprecise data using a statistical model in analyzing error, or Kalman filter, may be applied to the two sets of computed locational data, and the estimate of location and orientation may be optimized. Optional image data, where an on-board camera or other imaging element is employed, may be processed through a processing function such as a scale-invariant feature transform (SIFT) or a photo-stitching algorithm to enable pattern and feature differentiation and/or image-stitching as needed. Such an analysis may be used to support ground feature recognition and/or surface differentiation in post-processing.

Assembled data packets may be transmitted using a Bluetooth relay 261 or other wireless communication link element of the ground tracking device, and the Bluetooth link 266 or other wireless link of the associated smart device 252 (as shown in FIG. 21). The interrupt may then be then reset. The Bluetooth data acquisition process 284 may have received detection data and any other sensor data from the Bluetooth link 266 of the locator 104. This may be done in parallel with the system interrupt process described above. The detection data and other sensor data may be stored, and the data may be time-tagged in data packets locally within the ground tracking device so that they can be read during the read-and-calculate process 282. Other configurations of the system may use alternative methods of data transfer, such as a physically transferred removable memory device such as a USB thumb drive, which can then be used to transfer data to a desktop or notebook computer, network server, tablet, or other device, for example.

Figure 23:
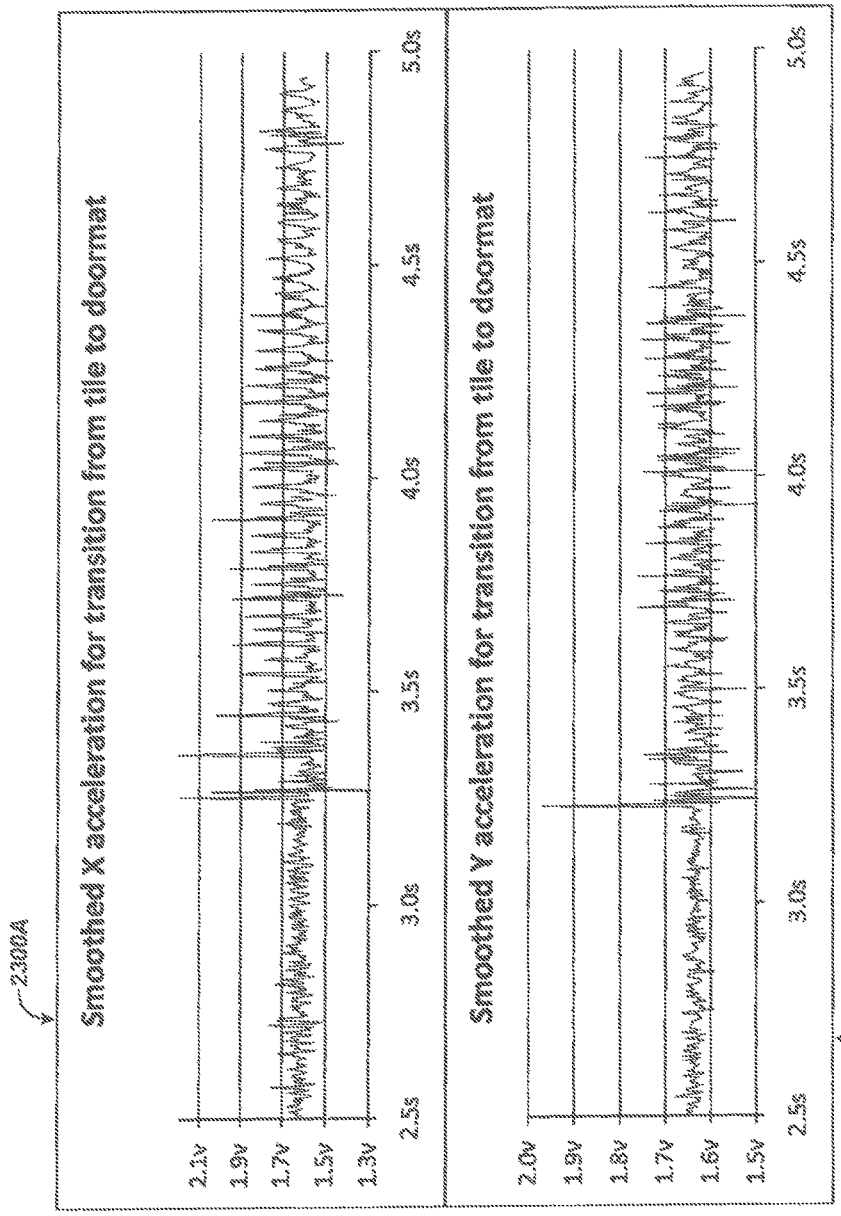
FIG. 23 is a graph illustrating example X and Y sensor outputs from an on-board accelerometer embodiment which may be used in differentiating ground surface types in accordance with aspects of the present disclosure.

Turning to FIG. 23, graphs 2300A and 2300B illustrating example data from a three-axis accelerometer IC 190 (as shown in FIG. 21) to differentiate ground surface textures are illustrated. The accelerometer output data is shown in Graph 2300A for X axis acceleration in an example transition from tile to doormat surfaces and in Graph 2300B for corresponding Y axis acceleration. Graphs 2300A and 2300B represent signals associated with the movement of an example dual wheel ground tracking device, such as device 196 in system 194, while transitioning from a tile surface to a rough-textured doormat. The transition at the 3.25-second mark in the signal voltage can be seen to mark a sharp increase in signal and a change in pattern. In various embodiments, such signals can be determined for various ground or surface textures and stored for subsequent processing, such as for comparison to sensed data as described previously herein to determine a particular type or class of surface. This processing may be done in a ground tracking device, locator or other measurement device, in post-processing, such as on a computer or other processing system, or in various combinations of these or other elements.

Figure 24:
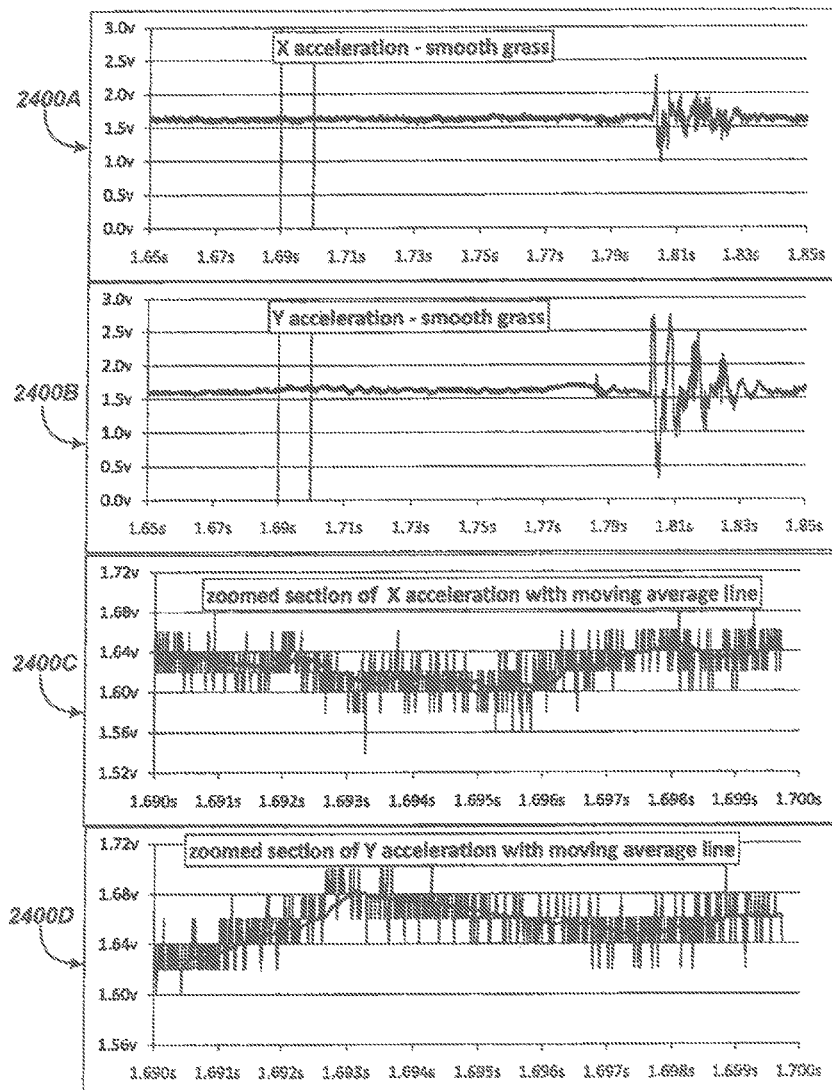
FIG. 24 is a graph illustrating example X and Y sensor outputs for the accelerometer embodiment of FIG. 23, at two different scales.

Turning to FIG. 24, Graphs 2400A, 2400B, 2400C, and 2400D illustrating similar data representing movement of an example ground tracking device over a grass terrain are shown. In this example, the data was generated from a two wheel ground tracking device; however, similar data may be generated from an embodiment using a single wheel ground follower element or other configuration (such as a spherical embodiment). The example graphs are presented in two scales for the same data set. The graph 2400A illustrates X-axis samples from sample times tagged 1.65 to 1.85 seconds. The graph 2400B illustrates corresponding Y-axis samples. Graphs 2400C and 2400D represent corresponding X and Y samples tagged from times 1.69 to 1.70 seconds (zoomed in from 2400A and 2400B with a moving average line added). The contrast in X and Y movement values can be seen more clearly as the scale of the graph is reduced. These variations in acceleration may be Kalman filtered to estimate motion or position changes, such as elevation changes and map depressions, berms, and curb steps, and/or other features above buried utilities.

Figure 25:
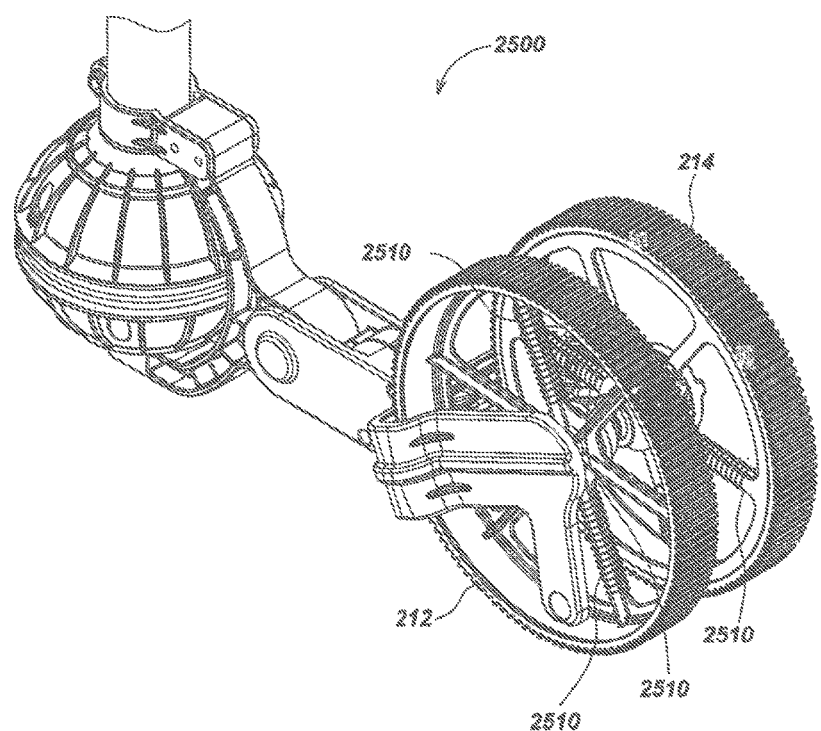
FIG. 25 illustrates details of an embodiment of a ground tracking device with incorporated sondes in accordance with aspects of the present disclosure.

In some embodiments, one or more low powered transmitting dipole sondes, such as shown in embodiment 2500 of FIG. 25, may be incorporated in or attached to a ground follower element, such as the wheel 116 of FIG. 2, or alternately one or more transmitting dipole sondes, such as coils 2510, may be attached to each of the left wheel 212 and the right wheel 214 as shown in FIG. 25, which corresponds with the dual wheel ground tracking device embodiment of FIG. 11. These may include coils wound on spokes, such as dipole coils 2510 placed on left and right wheels as shown in FIG. 25, or placed on other elements of the wheels. The rotation and relative position of each of these transmitting dipole sondes may be sensed, such as by periodically or continuously being tracked by in the locator 104 (for example, in a typical configuration with a ground tracking device coupled to a locator, the locator device includes the capability of measuring signals from sondes and can measure signals from additional sondes disposed on the wheel(s), such as shown in FIG. 25).

The transmitting dipole sondes may be attached in various positions on the wheels. In an exemplary embodiment, each sonde may be attached so that it is centered on the axis of rotation of each wheel and so that the dipole axis of each attached sonde is orthogonal to the wheel axis of rotation in such a manner that the dipole axis is centered on and rotates about the axis of rotation of the wheel it is attached to. Each sonde may have a uniquely identifiable electromagnetic signal which may be coded by coding mechanisms known or developed in the art. For example, each wheel sonde might simply transmit at a unique frequency.

Each wheel sonde may be battery powered, thereby avoiding the need for wired connections to locator 104. Each sonde may have a motion switch to automatically enable transmission during use and stop transmission after some period of time of no rotation thereby conserving battery power. The transmitted signal from each sonde may additionally be modulated by mechanisms to encode information from other sensors such as accelerometers, gyros, compasses, and the like. The dipole may be constructed in two parts with a pair of identical coils wired in series mounted onto or embedded into any opposite pair of wheel spokes, thereby effectively creating a single dipole field centered on the wheel axis of rotation.

Various example embodiments have been described previously herein to provide ground tracking devices that may be coupled to a locator or other measurement device. The ground tracking devices may be configured with a ground follower assembly, which may use an element such as one or more wheels, a sphere, or other mechanisms to follow the ground or other surfaces and provide sensed motion signals in multiple axes or dimensions. The motion signals may be processed in a processing circuit of the ground follower assembly to filter, correlate, generate motion and/or position data, and/or integrate the motion signals with other sensor data or information. The motion signals may be provided, either as raw signals or processed signals or data to the attached measurement device for further processing and/or data storage. Other combinations of the various aspects, elements, components, features, and/or functions described previously herein may be combined in various configurations.

In addition, details regarding additional aspects, elements, components, features, functions, apparatus, and/or methods which may be used in conjunction with the embodiments described previously herein in various implementations are described in the related applications of the assignee of the instant application.

In some configurations, the devices, elements, mechanisms, or apparatus may include means for performing various functions as described herein, such as are illustrated in the appended drawing figures. The aforementioned means may be, for example, mechanical elements such as wheels or other ground follower elements, sensor elements, processor or processors and associated memory in which embodiments reside, such as in processing elements, on circuit boards or substrates, or in other electronic configurations performing the functions recited by the aforementioned means. The aforementioned means may include a non-transitory storage medium including instructions for use by a processor to implement, in whole or in part, the various sensing and measurement functions described previously herein. In another aspect, the aforementioned means may be a module or apparatus configured to perform the functions recited by the aforementioned means.

In one or more exemplary embodiments, the various data collection, measurement, storage and signal processing functions, methods and processes described herein and/or in the related applications may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any accompanying process or method claims present elements of the various steps in a sample order, however, this is not meant to be limiting unless specifically noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. In some embodiments mechanical elements and functions, such as ground follower assemblies, yoke assemblies, or other mechanical elements may be replaced, in whole or in part, by other elements, such as acoustic or optical elements. For example, in some embodiments, some or all of the mechanical elements of a ground follower assembly as described previously herein may include acoustic and/or optical ground movement detection elements in place of or in addition to mechanical elements such as wheels and yokes.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the aspects shown and described previously herein, but should be accorded the full scope consistent with the language of the claims, wherein reference to an element in the singular is not intended to mean "one and only one" unless specifically so stated, but rather "one or more". Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the invention.

We claim:

1. A ground tracking system for use with an instrument, comprising:
   - a ground follower assembly including:
   - a ground follower element including one or more permanent magnets;
   - a swing-arm element operatively coupled to the ground follower element; and
   - a plurality of multi-axis magnetic field sensors to sense movement of the ground follower assembly permanent magnets relative to a surface in two or more axes of motion and generate an output signal based at least in part on the movement; and
   - a detachable mounting assembly floatably attach the ground follower assembly to the instrument;
   - wherein the instrument comprises a magnetic field sensing buried utility locator for determining position information associated with the buried utility based on magnetic fields emitted from currents flowing therein.

2. The system of claim 1, wherein the instrument comprises a man portable utility locator.

3. The system of claim 1, wherein the ground follower assembly comprises a wheel positioned to be retained in contact with a ground surface during movement of the instrument.

4. The system of claim 1, wherein the ground follower assembly comprises a plurality of wheels positioned to be retained in contact with a ground surface during movement of the instrument.

5. The system of claim 3 or claim 4, wherein the magnetic field sensing buried utility locator includes a lower antenna ball and the ground follower is coupled to the locator adjacent the lower antenna ball.

6. The system of claim 1, further comprising a GPS module disposed in the ground follower assembly for generating GPS positional information in conjunction with the magnetic field sensed position information.

7. The system of claim 1, further comprising a Bluetooth link module disposed in ground follower assembly.

8. The system of claim 1, further comprising a gyroscopic module disposed in the ground follower assembly.

9. The system of claim 1, further comprising a compass sensor disposed in the ground follower assembly.

10. The system of claim 1, further comprising an imaging element disposed in the ground follower assembly.

11. The system of claim 1, further comprising a processing element disposed in the ground follower assembly.

12. A ground tracking device for use with an instrument to measure motion of the instrument, comprising:
    - a wheel;
    - a wheel sensor element comprising a multi-axis magnetic field sensor to measure a rotation of the wheel and generate a wheel rotation output signal corresponding to the rotation of the wheel;
    - a swing arm assembly coupled to the wheel assembly;
    - a yoke assembly coupled to the swing arm assembly;
    - a swing arm sensor element comprising a multi-axis magnetic field sensor to sense a rotary motion of the second end of the swing arm assembly and generate a swing arm rotation output signal corresponding to the rotary motion of the swing arm assembly;
    - a yoke sensor element comprising a multi-axis magnetic field sensor to sense a rotation of the yoke assembly relative to a centerline of a measurement device and generate a yoke rotation signal corresponding to the rotation of the yoke assembly; and
    - a processing element to receive provide the swing arm output signal and the yoke rotation signal and provide a movement output signal to the instrument.

* * * * *